United States Patent
Goswami et al.

(10) Patent No.: US 12,351,080 B1
(45) Date of Patent: Jul. 8, 2025

(54) OCCUPANT PROTECTION SYSTEMS THAT ADJUST OCCUPANT SEAT POSITIONS FOR SAFETY AND COMFORT

(71) Applicant: Zoox, Inc., Foster City, CA (US)

(72) Inventors: Swagat Goswami, Cupertino, CA (US); Andrew Frank Raczkowski, San Jose, CA (US); Goutham Shanmuga Sundaram, Fremont, CA (US)

(73) Assignee: Zoox, Inc., Foster City, CA (US)

( * ) Notice: Subject to any disclaimer, the term of this patent is extended or adjusted under 35 U.S.C. 154(b) by 64 days.

(21) Appl. No.: 17/708,928

(22) Filed: Mar. 30, 2022

(51) Int. Cl.
  *B60N 2/02* (2006.01)
  *B60R 21/01* (2006.01)
  *B60R 21/015* (2006.01)
  *B60R 21/013* (2006.01)
  *B60R 21/02* (2006.01)

(52) U.S. Cl.
  CPC ...... *B60N 2/0276* (2013.01); *B60R 21/01552* (2014.10); *B60R 2021/01252* (2013.01); *B60R 2021/01315* (2013.01); *B60R 2021/0253* (2013.01)

(58) Field of Classification Search
  CPC ............ B60N 2/0276; B60R 21/01552; B60R 2021/01252; B60R 2021/01315; B60R 2021/0253
  See application file for complete search history.

(56) References Cited

U.S. PATENT DOCUMENTS

| | | | |
|---|---|---|---|
| 3,774,936 A | 11/1973 | Barnett et al. | |
| 5,470,103 A | 11/1995 | Vaillancourt et al. | |
| 6,382,660 B1 | 5/2002 | Starner et al. | |
| 6,863,299 B2 | 3/2005 | Schneider et al. | |
| 6,913,280 B2 | 7/2005 | Dominissini et al. | |
| 6,932,380 B2 | 8/2005 | Choi et al. | |
| 7,195,276 B2 | 3/2007 | Higuchi | |
| 7,222,877 B2 | 5/2007 | Wipasuramonton et al. | |
| 7,726,684 B2 | 6/2010 | Breed et al. | |

(Continued)

FOREIGN PATENT DOCUMENTS

| DE | 4212416 A1 | 11/1992 |
|---|---|---|
| DE | 10007343 A1 | 8/2001 |

(Continued)

OTHER PUBLICATIONS

"Passenger Airbag; Bag in Roof (BIR)", Bustos et al., Cognitive Safety Systems; TRW Automotive, Apr. 1, 2014; 19 pages.

(Continued)

*Primary Examiner* — Tyler J Lee

(74) *Attorney, Agent, or Firm* — EIP US LLP

(57) ABSTRACT

A vehicle occupant protection system may comprise a vehicle seat adjustment control system. The control system may be configured to receive from a vehicle sensor a signal associated with an occupant sitting on a vehicle seat. Based upon the received signal, the control system may be configured to determine a feature associated with a body of the occupant sitting on the vehicle seat is located outside a zone of safe impact with an airbag in a deployed state, and cause a vehicle seat adjustment mechanism to adjust a position of the vehicle seat so that the feature associated with the body of the occupant sitting on the vehicle seat is located within the zone of safe impact with the airbag in the deployed state.

20 Claims, 8 Drawing Sheets

(56) References Cited

U.S. PATENT DOCUMENTS

| | | | |
|---|---|---|---|
| 8,403,358 B2 | 3/2013 | Choi et al. | |
| 8,807,593 B2 | 8/2014 | Lee et al. | |
| 9,004,526 B2 | 4/2015 | Fukawatase et al. | |
| 9,108,584 B2 | 8/2015 | Rao et al. | |
| 9,446,735 B1 | 9/2016 | Jayasuriya et al. | |
| 9,493,135 B2 | 11/2016 | Fukawatase | |
| 9,725,064 B1 | 8/2017 | Faruque et al. | |
| 9,802,568 B1 | 10/2017 | Larner | |
| 9,969,346 B2 | 5/2018 | Patel et al. | |
| 9,994,182 B1 | 6/2018 | Jaradi et al. | |
| 10,279,770 B2 | 5/2019 | Faruque et al. | |
| 10,471,923 B2 | 11/2019 | Jimenez et al. | |
| 10,647,286 B1 | 5/2020 | Dennis et al. | |
| 11,077,816 B1 | 8/2021 | Bates et al. | |
| 2002/0158453 A1* | 10/2002 | Levine | B60K 23/02 280/735 |
| 2006/0097492 A1 | 5/2006 | Bakhsh et al. | |
| 2006/0226640 A1 | 10/2006 | Prakah-Asante et al. | |
| 2010/0140909 A1 | 6/2010 | Jang | |
| 2010/0225096 A1 | 9/2010 | Bustos Garcia et al. | |
| 2013/0197764 A1 | 8/2013 | Thomas | |
| 2013/0218420 A1* | 8/2013 | Jendritza | B60N 2/0276 701/49 |
| 2014/0097601 A1 | 4/2014 | Fukawatase et al. | |
| 2014/0375033 A1 | 12/2014 | Fukawatase | |
| 2016/0031401 A1 | 2/2016 | Jaradi et al. | |
| 2016/0129868 A1* | 5/2016 | Choi | B60R 21/0134 280/735 |
| 2016/0288752 A1* | 10/2016 | Stancato | B60R 21/01546 |
| 2016/0311393 A1 | 10/2016 | Smith et al. | |
| 2017/0225641 A1 | 8/2017 | Faruque et al. | |
| 2017/0267204 A1 | 9/2017 | Farooq et al. | |
| 2018/0201213 A1* | 7/2018 | Gandhi | B60R 21/0134 |
| 2018/0215338 A1 | 8/2018 | Faruque et al. | |
| 2018/0222432 A1 | 8/2018 | Schneider | |
| 2019/0016291 A1 | 1/2019 | Paxton et al. | |
| 2019/0106215 A1 | 4/2019 | Penley et al. | |
| 2019/0126878 A1 | 5/2019 | Fukawatase et al. | |
| 2019/0193666 A1 | 6/2019 | Jost et al. | |
| 2019/0299902 A1 | 10/2019 | Nagasawa et al. | |

FOREIGN PATENT DOCUMENTS

| | | |
|---|---|---|
| GB | 2385303 A | 8/2003 |
| JP | 2002079862 A | 3/2002 |
| JP | 2008162546 A | 7/2008 |
| WO | 2005000638 A1 | 1/2005 |
| WO | 2012122997 A1 | 9/2012 |

OTHER PUBLICATIONS

"Passenger Airbag: Bag in Roof Technology", TRW Occupant Safety Systems (Jan. 1, 2013); 2 pages.

United States Non-Final Office action dated Nov. 19, 2018 for U.S. Appl. No. 15/693,641.

United States Final Office action dated Apr. 19, 2019 for U.S. Appl. No. 15/693,641.

United States Non-Final Office Action dated Jan. 21, 2021 for U.S. Appl. No. 16/453,560.

* cited by examiner

US 12,351,080 B1

OCCUPANT PROTECTION SYSTEMS THAT ADJUST OCCUPANT SEAT POSITIONS FOR SAFETY AND COMFORT

BACKGROUND

Airbags protect occupants of a vehicle from injury during a collision involving the vehicle. An airbag system may include an airbag and an inflator for providing the airbag with a gas to inflate the airbag. Upon involvement in a collision, airbags may rapidly inflate to create a cushion between the vehicle occupant and interior surfaces of the vehicle.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
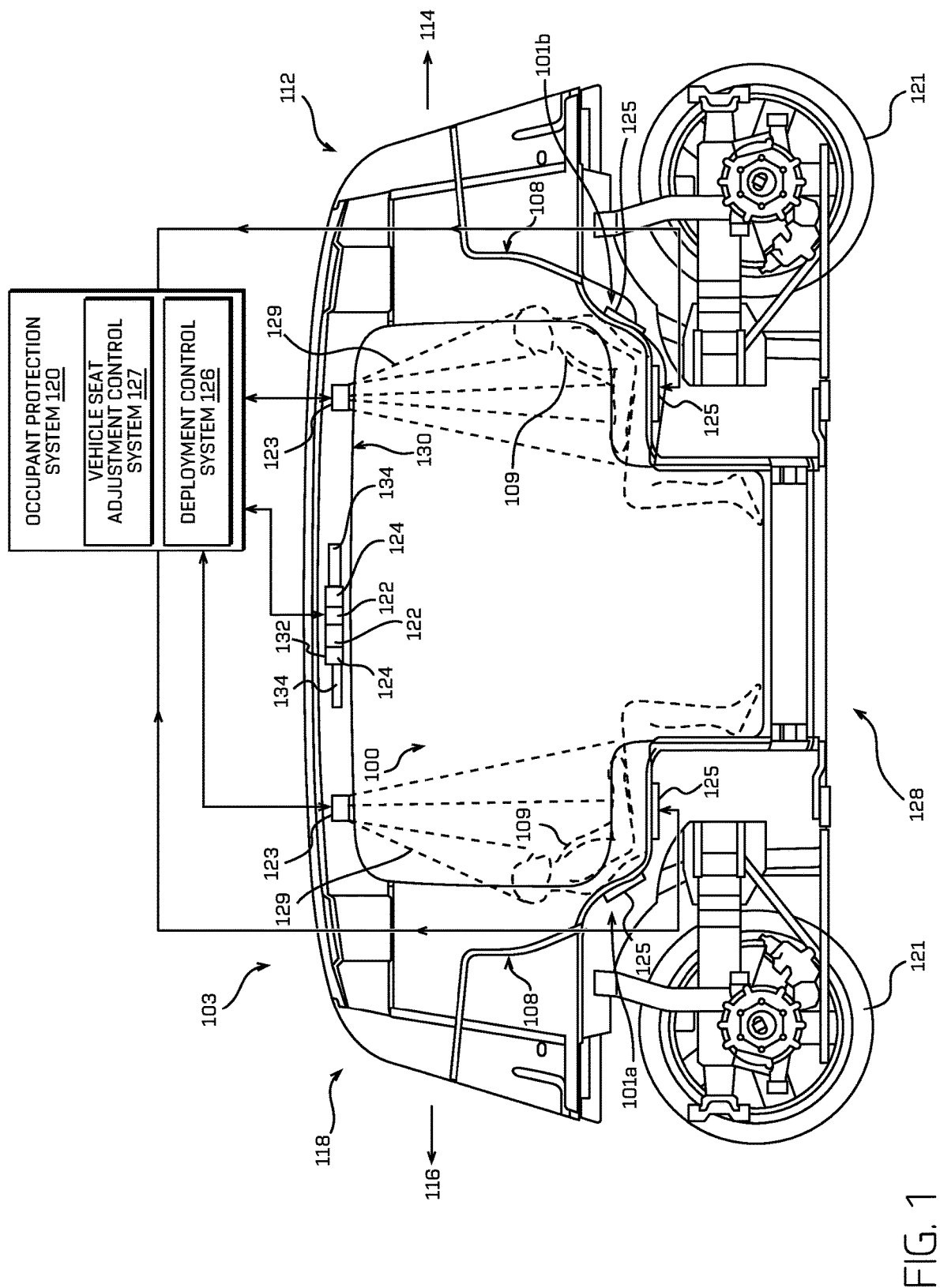
FIG. 1 is a cutaway side view of an example vehicle including an example vehicle occupant protection system.

Vehicle occupant protection systems such as airbag systems may be used to protect occupants of a vehicle from injury during a collision involving the vehicle. An airbag system may include an airbag, or expandable bladder, and an inflator for providing the airbag with a gas to inflate the airbag. Upon involvement in a collision, the airbag may rapidly inflate to create a cushion between the occupant in the vehicle and one or more interior surfaces of the vehicle. Different vehicle designs may result in difficulty in protecting vehicle occupants with an airbag system or present other problems. For example, in a vehicle with carriage style seating, no steering wheel, and/or no instrument panel, airbags may be deployed from a roof area near a center of the interior of the vehicle. Such vehicle designs may have too much space or distance between an occupant seated in the vehicle and the center of the vehicle, or may have an excessive amount of space or distance from the roof area to a floor of the vehicle. When airbags are deployed in such designs, the airbags may not provide sufficient length in a downward direction or in a direction towards a seated occupant to effectively protect such occupants during a collision. This can be particularly problematic for occupants having relatively short heights, e.g., children or people with heights below a certain percentile or percentage of a population. Examples herein may address or mitigate the above-noted drawbacks and address other problems with existing vehicles having occupant protection systems.

The present disclosure is generally directed to vehicles with occupant protection systems, occupant protection systems and methods of utilizing occupant protections systems. In examples, a vehicle may comprise a vehicle seat and a vehicle occupant protection system. The occupant protection system in examples may comprise at least one vehicle sensor, a vehicle seat adjustment mechanism, a vehicle seat adjustment control system and at least one airbag or expandable bladder. The airbag may be configured to expand between a stowed state and a deployed state. In examples, the vehicle seat adjustment control system may be configured to receive, from the vehicle sensor(s), one ore more signal(s) associated with the occupant sitting on the vehicle seat. Based upon the received signal(s), the vehicle seat adjustment control system may be configured to determine that a feature associated with the body of the occupant sitting on the vehicle seat is located outside (or within) a zone considered safe for impact with the airbag in the deployed state, e.g., when the expandable bladder deploys due to a vehicle collision or an expected vehicle collision. The vehicle seat adjustment control system may be further configured to, based upon the received signal(s), cause the vehicle seat adjustment mechanism to adjust a position of the vehicle seat so that the feature associated with the body of the occupant is located within the zone considered safe for impact with the deployed airbag. In this regard, the occupant protection systems herein help ensure that a vehicle occupant is seated on a vehicle seat at a safe position for interaction or impact with an airbag during a collision or a predicted collision. Such systems thus ensure that occupants of varying heights (e.g., occupants with shorter relative heights that may be below a certain percentile or percentage of a population) are seated on vehicle seats at positions (e.g., at a height) that allow the airbags to provide optimum protection when deployed and/or are seated at positions that make the occupants less susceptible to injury from the deployment of the airbags.

In examples, the vehicle sensor(s) described herein may comprise any suitable vehicle sensor(s) capable of generating signal(s) associated with a seated occupant, which signal(s) can be used to determine that a feature associated with a body of the seated occupant lies outside (or within)

a zone of safe impact or interaction with a deployed expandable bladder. In various examples, such sensor(s) may comprise (i) one or more cameras or imaging systems, (ii) one or more pressure sensors or pressure sensing systems, (iii) one or more weight sensors or weight sensing systems, (iv) one or more capacitance sensors or systems, and/or (v) one or more lasers or laser systems. In examples, the signal(s) may be generated by one or more camera or camera systems and may comprise the one or more cameras sensing a height of the seated occupant (e.g., sensing a height of the top of the occupant's head), or may comprise the one or more cameras generating image data associated with or indicative of a height of the seated occupant (e.g., data associated or indicative of a height of the top of the occupant's head) and the vehicle seat adjustment control system determining a height of the occupant's head based upon the image data.

The feature associated with the body of the occupant that the vehicle seat adjustment control system may determine is located outside the safe zone of impact may comprise any feature associated with the body that is suitable for determining that the occupant is seated at a position for safe interaction or impact with the airbag if the airbag were to deploy. In examples, the feature of the body may comprise any feature associated with the head and/or neck of the occupant. In some examples, the feature associated with the body may comprise at least one of the top of the occupant's head, a center of gravity of the occupant's head, a bottom of the occupant's head, the region between the bottom of the occupant's chin and a top of the occupant's head, the occupant's nose, the occupant's neck or a portion or region of the occupant's neck, one or more of the occupant's eyes, the region of the occupant's head measured from the front of the head to the back of the head, the region of the occupant's head between the occupant's nose and the occupant's chin, the occupant's forehead, the occupant's pelvic region or chest area, or a portion of the occupant's pelvic region or chest area.

The zones of safe impact or interaction in examples may be known or stored data that the vehicle seat adjustment control system utilizes in examples and may comprise, for example, data regarding boundaries and/or locations of such zones of safe impact. The zones of safe impact in examples may relate to data regarding lengths that various expandable bladders or airbags extend downwardly (e.g., from a vehicle roof) in deployed states and data regarding where various features associated with a body of any particular occupant should be located or positioned relative to those lengths so that the features are in a safe position for impacting the airbag when deployed (e.g., knowing where a top or height of an occupant's head, or the center of gravity of the occupant's head, should be located vertically relative to some portion of those lengths). Similarly, the zones of safe impact in examples may relate to data regarding distances expandable bladders or airbags may extend horizontally or longitudinally in deployed states and data regarding where various features associated with the body of any particular occupant should be located or positioned horizontally or longitudinally relative to those distances so that the features are located in a safe position for impacting the airbags when deployed (e.g., knowing where the forehead or nose of occupants should be located horizontally relative to that distance). In various examples, the boundaries of the safe zones of interaction may be formed by two dimensional spaces such as a rectangular space.

Turning now to FIG. 1, FIG. 1 is a side view illustrating an interior 100 of an example vehicle 103 of the present disclosure including a pair of occupants 109. The example vehicle 103 may be configured to travel via a road network from one geographic location to a destination carrying one or more of the occupants 109. For example, interior 100 may include vehicle seats 101a, 101b, which may be provided in any relative arrangement. Example vehicle 103 shown in FIG. 1 includes an example carriage-style seating arrangement in a substantially central portion of the interior 100 of the vehicle 103. For example, the vehicle 103 may include vehicle seats 101a, 101b, which in some examples, may face each other, as shown in FIG. 1. Other relative arrangements and numbers of vehicle seats are contemplated.

In examples, the vehicle 103 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 103 may be configured to control all functions from start to completion of the trip, including all parking functions, it may not include a driver and/or controls for driving the vehicle 103, such as a steering wheel, an acceleration pedal, and/or a brake pedal. This is merely an example, and the systems, vehicles occupant protection systems, expandable bladders and methods described herein may be incorporated into any groundborne, airborne, or waterborne vehicle, including those ranging from vehicles that need to be manually controlled by a driver at all times, to those that are partially or fully autonomously controlled.

The example vehicle 103 may be any configuration of vehicle, such as, for example, a van, a sport utility vehicle, a cross-over vehicle, a truck, a bus, an agricultural vehicle, and a construction vehicle. The vehicle 103 may be powered by one or more internal combustion engines, one or more electric motors, hydrogen power, any combination thereof, and/or any other suitable power sources. Although the example vehicle 103 has four wheels 121, the systems and methods described herein may be incorporated into vehicles having fewer or a greater number of wheels, tires, and/or tracks. The example vehicle 103 may have four-wheel steering and may operate generally with equal performance characteristics in all directions, for example, such that a first end 112 of the vehicle 103 is the front end of the vehicle 103 when travelling in a first direction 114, and such that the first end 112 becomes the rear end of the vehicle 103 when traveling in the opposite, second direction 116, as shown in FIG. 1. Similarly, a second end 118 of the vehicle 103 is the front end of the vehicle 103 when travelling in the second direction 116, and such that the second end 118 becomes the rear end of the vehicle 103 when traveling in the opposite, first direction 114. These example characteristics may facilitate greater maneuverability, for example, in small spaces or crowded environments, such as parking lots and urban areas.

As shown in FIG. 1, the vehicle 103 may include an occupant protection system 120 configured to protect one or more of the occupants 109 during a collision involving the vehicle 103. For example, the occupant protection system 120 may include one or more airbags or expandable bladders 124, a deployment control system 126, a vehicle seat adjustment mechanism 125 and a vehicle seat adjustment control system 127. The occupant protection system 120 may in examples further comprise one or more expandable curtain 122. The deployment control system 126 may be configured to control deployment of one or more of the expandable curtains 122 and one or more of the airbags or expandable bladders 124, so that the one or more airbags or expandable bladders 124 deploy from a stowed state, for example, as shown in FIG. 1, to a deployed state (e.g., expanded state), for example, as shown in FIGS. 2, 5A, 5B, 6A and 6B. In some examples, the occupant protection system 120 may also include a seatbelt system that includes a seatbelt for each of one or more of the occupants 109. The expandable curtain 122 and/or the airbags or expandable bladders may be formed from, for example, a woven nylon fabric and/or other similar materials, or materials having suitable characteristics for the vehicles and occupant protection systems described herein. Further details of example occupant protection systems including a deployable airbag or expandable bladder and a deployment controller may be found, for example, in U.S. Pat. No. 10,471,923 and U.S. application Ser. No. 17/555,206, each of which is incorporated herein in their entirety for all purposes.

As shown in FIG. 1, the example vehicle 103 may further include a chassis 128 including a vehicle roof 130 having a housing 132 configured to receive the expandable curtain(s) 122 and/or the expandable bladder(s) 124, each in the stowed (e.g., unexpanded state). In some examples, the expandable curtain(s) 122 and/or airbags or expandable bladder(s) 124 may be stored individually in separate housings. In some examples (e.g., those examples where portions of the expandable curtain(s) are separate), each portion may be stored individually in separate housings. In some examples, upon receipt of one or more signals from the vehicle 103, the deployment control system 126 may be configured to activate one or more inflators 134 in fluid or flow communication with the expandable curtain(s) 122 and/or the airbags or expandable bladder(s) 124, such that the inflators 134 provide a fluid or gas to the expandable curtain(s) 122 and/or the airbags or expandable bladder(s) 124, so that that the expandable curtain(s) 122 and/or the airbags or expandable bladder(s) 124 may expand from their stowed state (FIG. 1) to their respective deployed states, for example, as shown in FIGS. 2, 5A, 5B, 6A and 6B. For example, the inflators 134 may include a gas generator, pyrotechnic charge, propellants, and/or any other suitable devices or systems. The expandable curtain(s) 122 and/or expandable bladder(s) 124 may be configured to deploy in, for example, less than 100 milliseconds or less than 50 milliseconds (e.g., the second phase of the deployed state discussed herein may in examples be completed in less than 100 or less than 50 milliseconds). In one example the expandable bladder may be configured to expand in 70 milliseconds. As explained herein, the expandable curtain(s) 122 and/or the expandable bladder(s) 124, in the deployed state may protect an occupant 109 from injury (or reduce its likelihood or severity) during a collision involving the vehicle 103 by providing a cushion between the occupant 109 and interior structures of the vehicle 103, so that the occupant 109 will be prevented from being thrown into the interior structures and/or, in some instances, being ejected from the vehicle 103.

In examples, the occupant protection system 120 may further comprise one or more of the suitable vehicle sensors discussed herein, which in FIGS. 1-6B are illustrated as cameras or camera/imaging systems 123 having respective field of view(s) 129. The field of view(s) 129 in various examples may be configured to extend an entire 360 degrees around respective occupants 109 when the occupants 109 are seated and may be configured to produce image data associated with a feature of a body of one or more of the seated occupants 109 as described herein. It should be appreciated that in various examples, any of the camera or camera systems herein may comprise more than two cameras or a single camera. The single camera or multiple cameras may be configured to, for example, comprise a field of view 129 that surrounds any single occupant 109 or that surrounds multiple occupants 109 sitting in any of the vehicle seats described herein, including the illustrated carriage style arrangement of vehicle seats 101a, 101b. In examples, the one or more cameras 123 may comprise any suitable camera(s) or camera systems configured to generate signal(s) regarding the occupant 109, which signal(s) can be used to determine that a feature of the body of the occupant lies outside (or within) a zone for safe impact or interaction with a deployed airbag or expandable bladder of an occupant protection system. Example sensor or sensor systems comprising a camera or camera system configured to generate signal(s) associated with a seated vehicle occupant are described in U.S. application Ser. No. 17/359,357, the entire contents of which are incorporated herein by reference for all purposes. In some examples, the signal(s) generated from the one or more cameras (or other suitable vehicle sensor or sensor systems) may comprise a sensed height of an occupant sitting in a vehicle seat (e.g., a sensed height of the top of the occupant's head when seated in a vehicle seat). In other examples, the signal(s) generated from the one or more cameras (or other suitable sensor or sensor systems) may comprise data (e.g., image data) associated with, or indicative of, a height of an occupant sitting in a vehicle seat (e.g., data associated with a height of the top of the occupant's head when seated in a vehicle seat) and the height may be determined based upon the data associated with or indicative of the height of the seated occupant.

As mentioned, in various examples, the one or more vehicle sensors herein may be any suitable vehicle sensors configured to generate signal(s) associated with the seated occupant that can be used to determine a feature associated with one or more seated occupant's body lies outside a zone for safe impact or interaction with an airbag or expandable bladder when deployed. For example, in addition to, or alternative to, the one or more cameras 123 mentioned above, various implementations may comprise one or more pressure sensor, one or more capacitance sensor, one or more laser, and/or one or more weight sensors. The pressure sensor(s), capacitance sensor(s), laser(s), and/or weight sensor(s) may be located at any position in the vehicle 103 suitable for generating signal(s) associated with the occupant(s) 109 seated in the vehicle 103, which signals can be used to determine whether a feature associated with the body of the occupant(s) 109 is located outside a safe zone of interaction with an airbag. In one example, the one or more laser sensor(s) may determine a position of an occupant(s) head, e.g., determining a horizontal distance between the occupant(s) head and the vehicle seat (e.g., a seat back or a head rest of the vehicle seat). It should be appreciated that any suitable vehicle sensor signal(s) described herein may be used in combination with, for example, stored occupant user profiles (e.g., stored information with respect individual passengers) to determine a particular feature associated with the occupant's body and/or whether the feature associated with the occupant's body is located outside a zone of safe interaction with an airbag. It should also be appreciated that signals from the one ore more weight, pressure, capacitance or laser sensor(s) herein may operate independently, or in combination with signal(s) from the camera 123. Similarly, any of the sensors described herein may operate independent or in combination with any of the other sensors described herein. For example, the one or more weight capacitance or pressure sensors may be disposed at or under the vehicle seats 101a, 101b such that the weight sensor(s), the capacitance sensor(s), and/or the pressure sensors may generate signal(s) of an occupant 109 sitting in the vehicle 103, which signal(s) may then be used either alone or in combination with signal(s) from the camera 123 (and or alone in combination with stored user profiles) to determine that a feature associated with the body of seated occupant 109 lies outside (or within) a zone for safe impact or interaction with a deployed expandable bladder or airbag. In examples, the one or more weight sensors and/or pressure sensor(s) may be positioned at least partially under vehicle seats 101a and/or 101b to sense or generate signal(s) indicative of a weight and/or pressure of the occupant 109 sitting on the vehicle seat 101a or 101b, and the signal(s) may be used by themselves, or in combination, with signal(s) from the camera(s) 123 for determining that a feature associated with the body of the seated occupant 109 lies outside (or within) a zone for safe impact or interaction with a deployed expandable bladder or airbag.

The example vehicle seat adjustment mechanism 125 illustrated in FIG. 1 (and FIGS. 2-6B) comprises at least one inflatable bladder (described also with respect to FIGS. 2-6B below). In other examples, the vehicle seat adjustment mechanism 125 may comprise any suitable mechanism, device or system configured to adjust or change position of one or more vehicle seats, such as vehicle seats 101a, 101b, so that a position or location of one or more occupants 109 sitting in the vehicle seats 101a, 101b may likewise be adjusted (e.g., adjust the seat position vertically and/or horizontally, which may comprise adjusting an angle of a vehicle seat back or a height of vehicle seat bottom in various examples). In the examples illustrated by FIGS. 1-6B, the vehicle seat adjustment mechanism 125 comprises one or more inflatable bladders 110a-110h, which comprise an inflation type actuator 153. In further examples, the vehicle seat adjustment mechanisms herein may comprise a pivotable, slidable, or otherwise movable plate or other structural member to adjust a position of the vehicle seats. The plate or structural member may be actuated by any suitable actuator such that when a force is applied to the plate or structural member, the plate or structural member adjusts the position of one or more of the vehicle seats 101a-101b (e.g., adjusts the seat bottoms, seat backs, seat tubs or individual seat spaces as described herein). In some examples, the vehicle seat adjustment mechanisms herein may comprise one or more actuator having one or more of a spring, a hydraulic actuator, a pneumatic actuator, a motor, an electro-magnet, or a pyro-technic device, or any other suitable device for applying a force to the plate or other structural member to adjust the vehicle seat position. In various examples, the vehicle seat adjustment mechanisms may comprise one or more actuator configured so that adjustment of the vehicle seat(s) is reversible. That is, the vehicle seat adjustment mechanism may comprise one or more actuator configured to enable the vehicle seat(s) to be adjusted, for example, (i) both upwardly and downwardly, and/or (ii) both backwards and forwards (e.g., the angle of the seat back adjusted backwards and forwards). In examples, the actuator(s) may comprise (i) one or more inflatable bladder and a reversible pump that provides positive and negative pressure to the bladder(s) to inflate and deflate the bladder(s), or (ii) any suitable mechanical or electro-mechanical actuator(s) configured to move the vehicle seat both upwardly and downwardly and/or both backwards and forwards. Such reversible vehicle seat adjustment actuator(s) may in examples be employed multiple times (e.g., for multiple different occupants, multiple times while a vehicle is operating or multiple times for a single occupant upon entering the vehicle), allow for automatic or manual adjustment of the vehicle seat position for comfort and/or safety, and allow for a continuous feedback loop with the vehicle seat adjustment control system and/or the occupant protection system to enable vehicle seat position(s) to be adjusted on a continuous basis. In various examples, the vehicle seat adjustment actuator(s) herein may comprise one or more actuators that are non-reversible and configured to move vehicle seat(s), for example, (i) only upwardly or downwardly, and/or (ii) only backwards or forwards (e.g., a pyro-technic device that inflates bladder(s) quickly but may only be able actuatable or employable a single time). It should additionally be appreciated that in various examples, the vehicle seat adjustment mechanisms herein may comprise both reversible actuator(s) and non-reversible actuator(s).

In some examples, the vehicle seat adjustment mechanisms herein may comprise an adjustable material configured to change material property responsive to application of one or more stimuli (e.g., an electric field, magnetic field, heat, etc.). By way of example and not limitation, adjustable materials may include a shape memory material (SMM), shape-memory alloy, shape-memory polymer, electroactive polymer, magnetostrictive material, magnetic shape memory alloy, dielectric elastomer, or any other material that changes size, shape, rigidity, elasticity, and/or other physical properties responsive to one or more stimuli. In some examples, the adjustable material may be transitioned between a first state (inactive state) having a first physical property (e.g., size, shape, rigidity, and/or elasticity) and a second state (an activated state) having a second physical property (e.g., size, shape, rigidity, and/or elasticity) that is different from the first physical property. For instance, the first physical property may comprise a first rigidity at which the adjustable material is relatively easily compressed or deformed to provide occupant comfort, while the second physical property may be a rigidity that is greater than the first rigidity.

In some examples, the vehicle seat adjustment mechanism herein may comprise a plurality of different adjustment mechanisms. In further examples, the vehicles and occupant protection systems herein may further comprise one or more restraint surface adjustment mechanisms configured to adjust a restraint surface angle associated with the vehicle seats during a collision and/or a predicted collision. The restraint surface adjustment mechanisms in examples may operate independent of, or in combination with, the vehicle seat adjustment mechanisms described herein. For example, the vehicles and occupant protection systems herein may comprise a vehicle seat adjustment mechanism having one or more inflatable bladders that adjust a position of a vehicle seat (as described herein), while also comprising one or more restraint surface adjustment mechanisms that may include one or more inflatable bladders, which are configured to adjust a restraint surface angle of the same vehicle seat. In examples, the inflatable bladder(s) of the restraint surface adjustment mechanism(s) of a vehicle seat may be located closer to an occupant's knees or feet, while the inflatable bladder(s) of the vehicle seat adjustment mechanism of the same vehicle seat may be located closer to an occupant's back, thighs or bottom area. Examples of restraint surface adjustment mechanisms configured to adjust an angle of restraint surface during a collision and/or a predicted collision are described in U.S. Pat. No. 11,077,816, the entire contents of which is incorporated herein by reference for all purposes.

The vehicle seat adjustment control system 127 may be electrically coupled to, or in signal communication with (i) the one or more vehicle sensors described herein, such as camera(s) 123, and (ii) the vehicle seat adjustment mechanisms described herein, such as vehicle seat adjustment mechanism 125. For example, the vehicle seat adjustment control system 127 may be configured to receive, from vehicle sensor(s) 123, signal(s) associated with an occupant 109 sitting in one or more of the vehicle seats 101*a*, 101*b* and use those signal(s) to determine a feature associated with the body of the occupant 109 sitting in one of the vehicle seats 101*a*, 101*b* is positioned within a zone for safe interaction with one of the airbags or expandable bladders 124A, 124B (e.g., safe zone 619 as described in the examples illustrated by FIGS. 5A, 5B, 6A and 6B). In some examples, the vehicle sensor(s) 123 may generate signal(s) indicative of or associated with the height of an occupant 109 seated in one of the vehicle seats 101*a*, 101*b* (e.g., a height of a top of the head of the occupant 109 in a seated position in one of vehicle seats 101*a*, 101*b*) and the vehicle seat adjustment control system 127 may determine that based upon that signal, the height of the occupant is located outside a position for safe interaction or impact with one of the deployed airbags or expandable bladders 124A, 124B. It should be appreciated that in various examples, the vehicle seat adjustment control systems described herein may determine that an occupant sitting in a vehicle seat is too short to adjust a position of the vehicle seat at all, e.g., having a height or weight that is below a certain percentage of the population.

Figure 2:
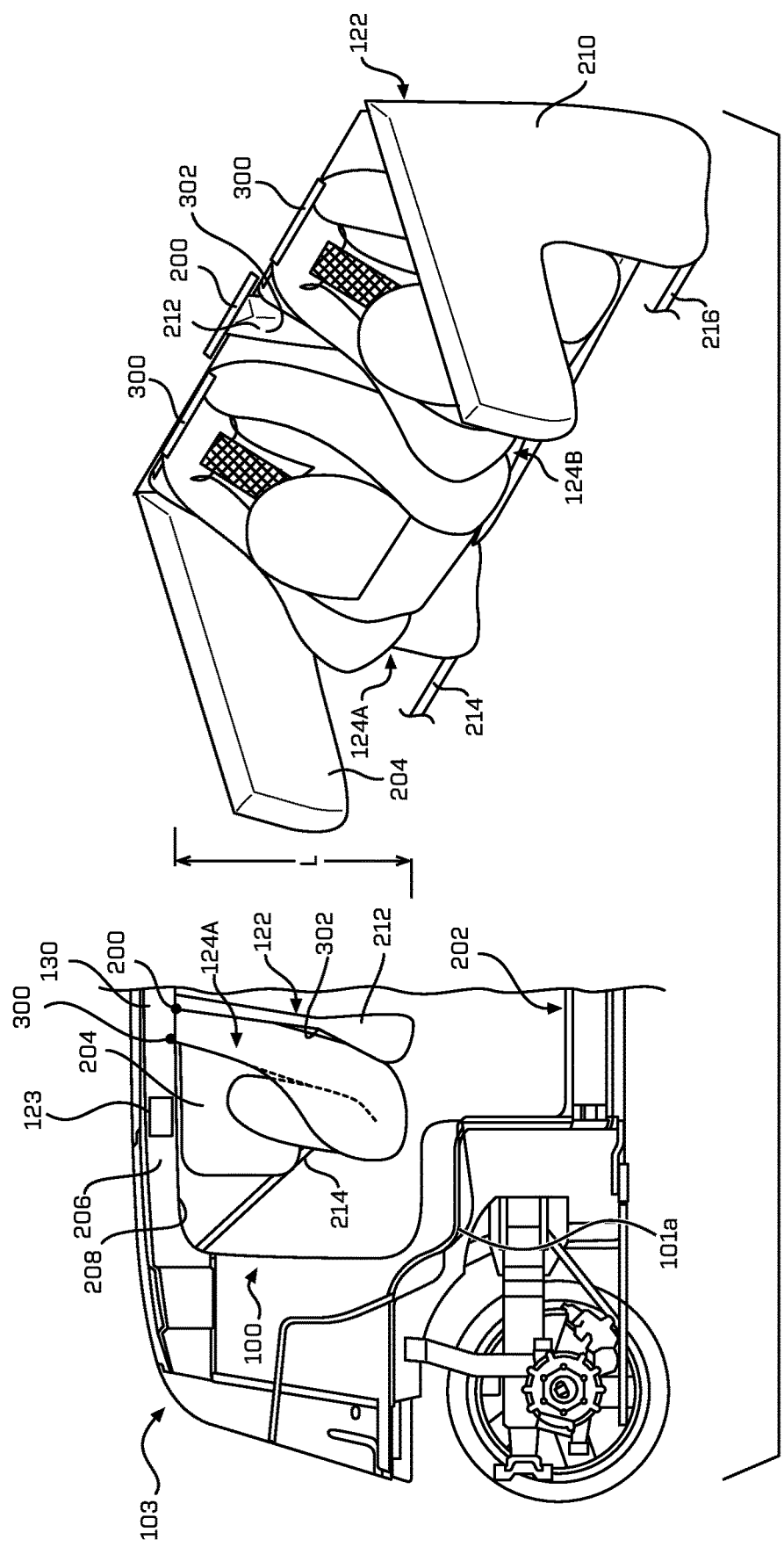
FIG. 2 is a partial side view and perspective view of the example vehicle shown in FIG. 1 with example airbags or expandable bladders and curtains illustrated in a deployed state.

Turning to FIG. 2, FIG. 2 illustrates the vehicle shown in FIG. 1 with example expandable bladders and curtains illustrated in a deployed state and with the occupants 109 omitted to aid clarity. FIG. 2 shows an example expandable curtain 122 in the deployed (e.g., expanded) state in the interior 100 of the vehicle 103. In the example shown, the expandable curtain 122 has been deployed from the vehicle roof 130 and is coupled to the vehicle roof 130 at an attachment point 200. In some examples, the expandable curtain 122 may be indirectly coupled to and supported by the vehicle roof 130, for example, via an intermediate coupling. The example expandable curtain 122 may be configured to be expanded from a stowed state, for example, as shown in FIG. 1, to a deployed state as shown having a length L as shown in FIG. 2. The airbag or expandable bladder 124 may likewise be configured to be expanded from a stowed, for example, as shown in FIG. 1 state to a deployed as shown, for example, in FIGS. 2-6B and having a length L as shown in FIG. 2. As shown, in some examples, the expandable curtain 122 extends toward the vehicle floor 202 and terminates at a location spaced above the vehicle floor 202. In some examples, the expandable curtain 122 may extend to and terminate at the vehicle floor 202. In the example shown, the expandable curtain 122 in the deployed state may include first side 204 configured to extend along a portion of a first interior side 206 of the vehicle 103. For example, the first side 204 of the expandable curtain 122 may extend in a direction substantially parallel to the first interior side 206 of the vehicle 103. In some examples, the first side 204 of the expandable curtain 122 may be deployed from a housing located above the opening 208 in the first interior side 206 and/or from the vehicle roof 130 of the vehicle 103. In some examples, the first side 204 of the expandable curtain 122 may be inflatable and may be configured to provide cushioning between the occupant 109 and the first interior side 206 of the vehicle 103.

In some examples, the expandable curtain 122 may also include a second side 210 opposite the first side 204 configured to extend along a portion of a second interior side (not shown in FIG. 2 due to limitations of the view provided) of the vehicle 103. The first and second interior sides of the vehicle 103 may be on opposite sides of the vehicle 103 and may extend substantially parallel to one another. In some examples, the second side 210 of the expandable curtain 122 may have structural, location, stowage, and/or deployment characteristics similar to, or the same as, the first side 204 of the expandable curtain 122, except that it may be located on the second interior side of the vehicle 103 and may be different to accommodate differences with being on the second interior side of the vehicle 103 instead of the first interior side 206.

The example expandable curtain 122 also includes a transverse portion 212 extending between the first side 204 and the second side 210 of the expandable curtain 122. In some examples, the first side 204, the second side 210, and the transverse portion 212 of the expandable curtain 122 form a contiguous barrier. For example, the first side 204, the second side 210, and the transverse portion 212 of the expandable curtain 122 may define a substantially U-shaped cross-sectional area as created by a plane normal to length extending downward from the roof 130 to the floor 202. In some examples, the first side 204, the second side 210, and the transverse portion 212 of the expandable curtain 122 form a continuous barrier. In some examples, one or more of the first side 204, the second side 210, or the transverse portion 212 of the expandable curtain 122 may include an additional expandable portion (e.g., a channel) located adjacent the vehicle roof 130. The one or more additional expandable portions may assist the deployment of the first side 204, second side 210, and/or transverse portion 212 from the housing 132 upon initiation of the deployment of the expandable curtain 122. For example, the one or more additional expandable portions may assist with forcing open portions of the interior trim of the vehicle 103 configured to permit the expandable curtain to deploy from underneath the trim.

In some examples, the occupant protection system 120 may include a first tether 214 coupled to the first side 204 and/or transverse portion 212 of the expandable curtain 122 and coupled to a portion of the vehicle 103, such as, for example, a portion associated with (e.g., directly or indirectly coupled to) the first interior side 206 (e.g., an interior panel or a structural member of the vehicle chassis 128) the floor 202, or the roof 130 of the vehicle 103, for example. For example, the first tether 214 may at one end be coupled to a free edge of the first side 204 of the expandable curtain 122, and at a second end coupled to an anchor associated with the first interior side 206 of the vehicle 103 and/or the vehicle roof 130. The occupant protection system 120 may also include a second tether 216 coupled to the second side 210 and/or transverse portion 212 of the expandable curtain 122 and configured to be coupled to a portion of the vehicle 103, such as, for example, a portion associated with (e.g., directly or indirectly coupled to) the second interior side, the floor 202, or the roof 130 of the vehicle 103, for example, in manner at least similar to the first tether 214. In some examples, the first and second tethers 214 and 216 may assist with preventing the expandable curtain 122, once deployed, from swinging in a direction away from the occupant 109 during the collision, for example, as the occupant 109 contacts the expandable curtain 122, either directly or indirectly, as explained herein. It should be appreciated that in various examples, the occupant protection systems herein may not include an expandable curtain 122 at all.

FIG. 2 further shows an example occupant protection system 120 with the example expandable curtain 122 and a first example airbag or expandable bladder 124A and second example airbag or expandable bladder 124B each in a deployed (e.g., expanded) state. It should be appreciated that first and second expandable bladders may correspond to first and second seated occupants seated in, for example, seating areas 108a, 108b of vehicle seat 101a or seating areas 108c, 108d of vehicle seat 101a. The example airbags or expandable bladders 124A, 124B may be configured to be expanded from a stowed state, for example, as shown in FIG. 1, to a deployed state, for example, as shown in FIG. 2.

In the example shown, each of the airbags or expandable bladders 124A and 124B has been deployed from the vehicle roof 130 and is coupled to the vehicle roof 130 at attachment points 300. For example, the airbags or expandable bladders 124A and 124B shown in FIG. 2 have expanded from a stowed state to a deployed state and are associated with (e.g., directly or indirectly coupled to) the transverse portion 212 of the expandable curtain 122, for example, such that the expandable curtain 122 may support the airbags or expandable bladders 124A and 124B when an occupant 109 contacts one of the airbags or expandable bladders 124A or 124B as the occupant 109 is urged forward in the direction toward which the vehicle seat 101a is facing and into the airbags or expandable bladders 124A and 124B (i.e., from left-to-right as shown in FIG. 2). For example, the transverse portion 212 of the expandable curtain 122 includes a support face side 302 facing the seat and the airbags or expandable bladders 124A and 124B, and as the occupant 109 contacts one of the airbags or expandable bladders 124A or 124B, the airbag or expandable bladder 124A or 124B presses against the support side face 302 of the expandable curtain 122. The expandable curtain 122, suspended from the vehicle roof 130 (or adjacent thereto) at the attachment point 200 and is supported by the first and/or second tethers 214 and 216, which prevent the expandable curtain 122 from swinging freely about the attachment point 200 forward in the direction in which the seat 101a is facing and the direction in which the occupant 109 is moving. In this example manner, the occupant protection system 120 may protect the occupant 109 during a collision involving the vehicle 103, by preventing the occupant 109 from colliding in an un-cushioned or unprotected manner with interior structures of the vehicle 103 and/or, in some instances, preventing the occupant 109 from being ejected from the vehicle 103.

In the example shown in FIG. 2, at least a portion of the first side 204 of the expandable curtain 122 and at least a portion of the second side 210 of the expandable curtain 122 extend away from the support face side 302 of the of the transverse portion 212 of the expandable curtain 122. In some examples, one or more of the airbags or expandable bladders 124A or 124B may be associated with (e.g., directly or indirectly coupled to) the support face side 302 of the transverse portion 212 and may be located between the first side 204 and the second side 210 of the expandable curtain 122, for example, as shown in FIG. 2.

The first airbag or expandable bladder 124A and/or the second airbag or expandable bladder 124B may each be configured to expand from a stowed state to a deployed state associated with the transverse portion 212 of the expandable curtain 122, for example. In some examples, the first airbag or expandable bladder 124A and/or the second airbag or expandable bladder 124B may be coupled to the transverse portion 212 of the expandable curtain 122. In some examples, the first airbag or expandable bladder 124A and/or the second airbag or expandable bladder 124B may not be coupled to the transverse portion 212 of the expandable curtain 122. For example, the first and/or second expandable bladder may be coupled, directly or indirectly, to the vehicle roof 130 independently of one another and/or independently of the expandable curtain 122.

In some examples, the deployment control system 126 (FIG. 1) may be configured to cause one or more of the first airbag or expandable bladder 124A, the second airbag or expandable bladder 124B, or the expandable curtain 122 to expand from the stowed state to the deployed state (e.g., an expanded state), for example, by activating one or more inflators 134 (FIG. 1) associated with (e.g., in flow or fluid communication with) one or more of the first airbag or expandable bladder 124A, the second airbag or expandable bladder 124B, or the expandable curtain 122. The first airbag or expandable bladder 124A, the second airbag or expandable bladder 124B, and the expandable curtain 122 may be deployed together, concurrently or substantially simultaneously, or may be deployed independently of one another. For example, the deployment control system 126 may be configured to cause the expandable curtain 122 to deploy and/or expand from the stowed state to the deployed state at a first time, and thereafter cause the first airbag or expandable bladder 124A and/or the second airbag or expandable bladder 124B to expand from the stowed state to the deployed state at a second time following the first time. In some examples, the first airbag or expandable bladder 124A or the second airbag or expandable bladder 124B may be deployed individually, for example, without necessarily deploying the other of the expandable bladders. By deploying the expandable curtain 122 and/or the airbag or expandable bladders 124A or 124B independently, the packaging of the occupant protection system 120 may be improved by, for example, reducing the size of gas generators associated with (e.g., that may form part of) the inflator(s) 134 and/or the housing(s) 132 used to contain the undeployed first and second airbags or expandable bladders 124A and 124B and expandable curtain 122. Additionally, or alternatively, by deploying the expandable curtain 122 and/or the airbags or expandable bladders 124A or 124B independently, replacement costs may be minimized, as only those deployed members would need replacing or refurbishing.

The example vehicle 103 shown in FIG. 1 and FIG. 2 may include a first seat 101a coupled to a portion the vehicle 103 and facing the first direction 114 relative to a longitudinal axis of the vehicle 103, and the vehicle 103 may also include a second seat 101b (FIG. 1) coupled to a portion the vehicle 103 and facing a second direction 116 opposite the first direction 114. In some examples of the occupant protection system 120, the first side 204 of the expandable curtain 122 and the second side 210 of the expandable curtain 122 may extend from the transverse portion 212 of the expandable curtain 122 in the second direction 116 toward the first seat. The first airbag or expandable bladder 124A may be configured to deploy between the transverse portion 212 of the expandable curtain 122 and the first seat.

Examples of the vehicles and occupant protection systems herein may include first and second expandable curtains at least partially stowed in a portion of the vehicle 103 and configured to be expanded from a stowed state to a deployed state extending between the vehicle roof 130 and the vehicle floor 202. Details of example first and second expandable curtains are discussed further in U.S. Pat. No. 10,471,923, which is incorporated herein by reference in its entirety for all purposes. In some such examples, protection may be provided for occupants of seats facing both directions. For example, the seats 101a and 101a may face one another, for example, as shown in FIG. 1, and the first and second expandable curtains 122A and 122B may be configured to deploy between the two seats 101a and 101b. In some examples, the deployment control system 126 may be configured to receive one or more signals indicative of a direction of travel of the vehicle 103, and cause deployment of the first expandable curtain and/or the second expandable curtain. For example, the first expandable curtain the first airbag or expandable bladder 124A, the second expandable curtain 122B, and/or the second airbag or expandable bladder 124B may be deployed based at least in part on the one or more signals indicative of the direction of travel of the vehicle 103.

For example, if the vehicle 103 is traveling with the first seat 101a facing the direction of travel (e.g., the first direction 114), before or during a collision, the deployment control system 126 may deploy the first expandable curtain and/or the first expandable bladder (e.g., associated with (e.g., within an effective distance from) the first seat 101a, and if the vehicle 103 is traveling with the second seat 101b facing the direction of travel (e.g., the second direction 116), before or during a collision, the deployment control system 126 may deploy the second expandable curtain and/or the second expandable bladder (e.g., associated with (e.g., within an effective distance from) the second seat 101b.

Figure 3:
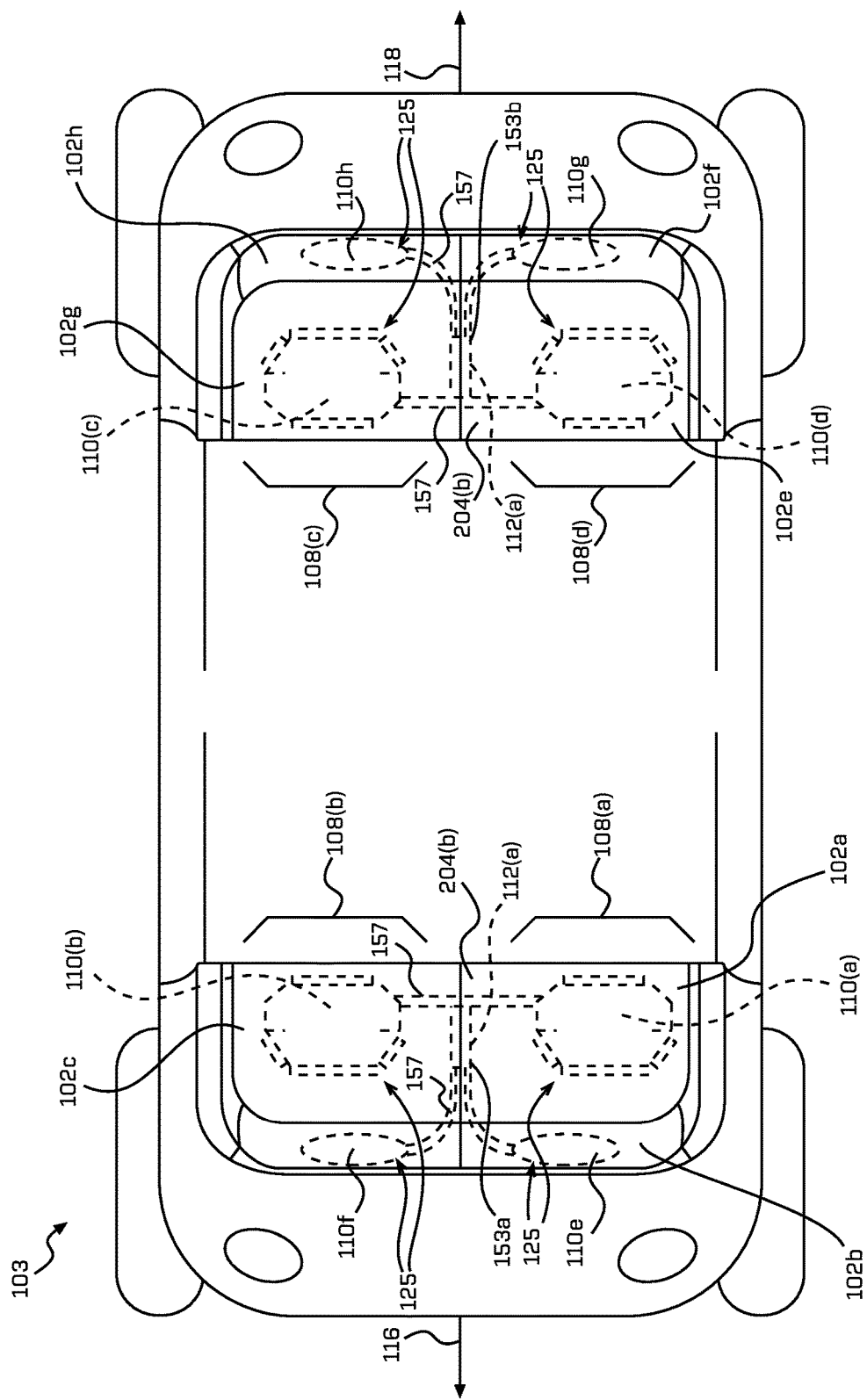
FIG. 3 is a perspective top view of an example vehicle comprising an example vehicle seating in a carriage style arrangement and comprising an example vehicle seat adjustment mechanism.
Figure 4:
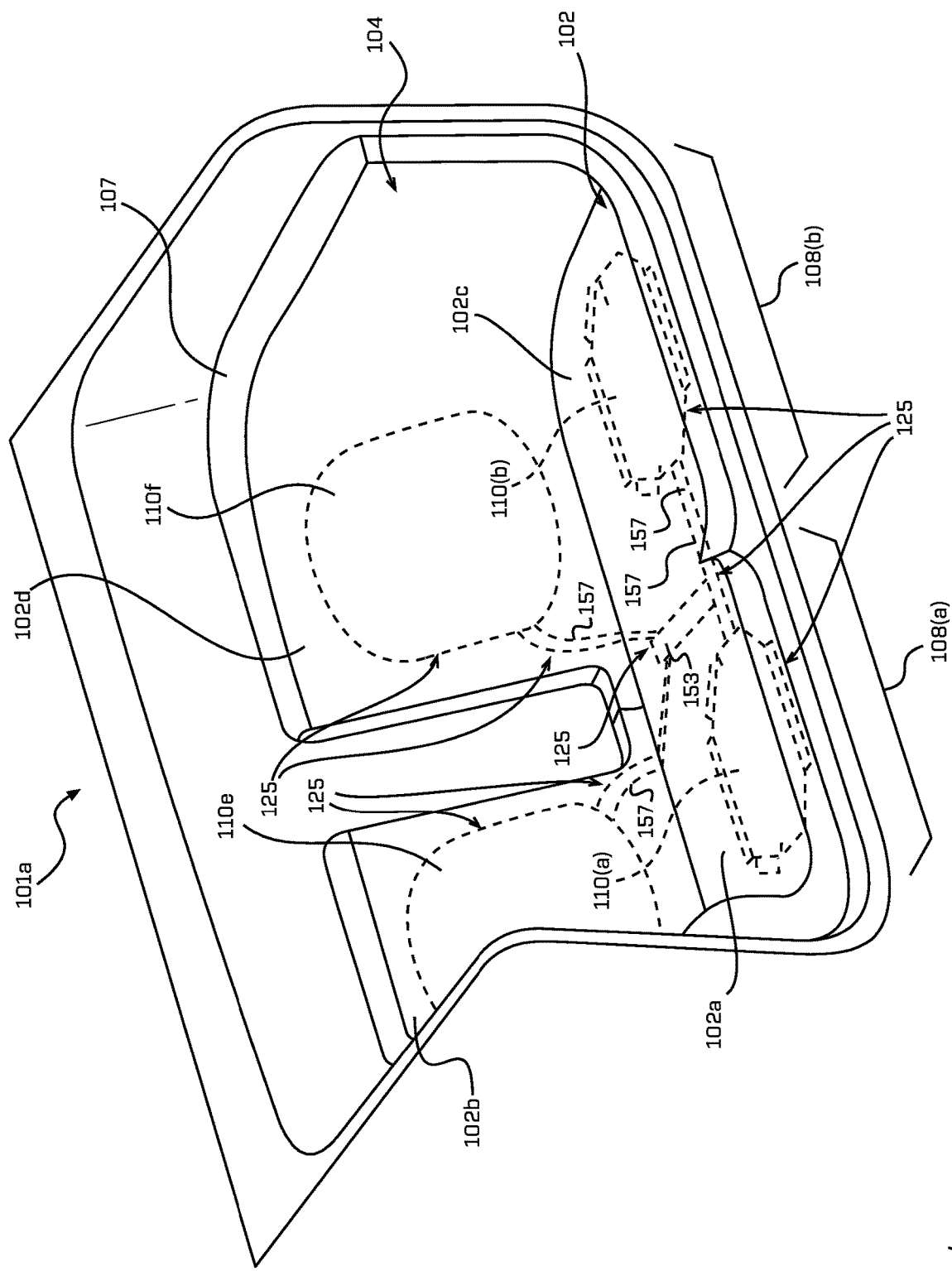
FIG. 4 is a perspective view of an example vehicle seat with an example vehicle seat adjustment mechanism.

Turning to FIG. 3 and FIG. 4, FIG. 3 illustrates a top view of an example vehicle 103 (FIG. 3) comprising example vehicle seats 101a, 101b (illustrated as bench-type seats arranged in a carriage style seating) and an example vehicle seat adjustment mechanism 125 for adjusting a position of the vehicle seats 101a, 101b (e.g., a height of the vehicle seat or an angle of a seat back of the vehicle seat). FIG. 4 illustrates a perspective view of example vehicle seat 101a and example vehicle seat adjustment mechanism 125 for adjusting a position of vehicle seat 101a. The example vehicle seat adjustment mechanism 125 illustrated in FIGS. 3 and 4 comprise one more inflatable bladders 110a-110h. However, it should be appreciated that in other examples, the vehicle seat adjustment mechanisms herein may be any suitable mechanisms or devices configured to adjust a position of vehicle seat(s) (e.g., adjust a position of vehicle seat height or vehicle seat back angle) so that a feature associated with a body of the occupant is located within a zone of safe interaction with an expandable bladder in the event that the expandable bladder gets deployed.

The vehicle seats 101a, 101b in the illustrated examples may each comprise a seat cushion 102 and a seat tub 104. Each seat tub 104 may be disposed under and/or behind each seat cushion 102. In some examples, each seat tub 104 may further be disposed under the vehicle seat adjustment mechanism 125. In other examples, the vehicle seat adjustment mechanism 125 may be disposed under a respective seat tub 104. In some examples, the vehicle seats 101a, 101b may be fixedly mounted to a body or frame of the vehicle (e.g., seat cushion 102 and/or seat tub 104 may be fixedly mounted to the body or the frame of the vehicle). It should be appreciated that in various examples, the vehicle seats herein may comprise any suitable configuration or design that enables the vehicle seats to adjust a position of the vehicle seat to ensure that a feature associated with a body of the occupant sitting in the vehicle seat is located within a safe zone for interaction with a deployed airbag.

In some examples, each illustrated seat cushion 102 may comprise one or more seat spaces for accommodating multiple occupants, such as seat spaces 108a-108d. Additionally, seat cushions 102 may comprise any finite number of seat spaces for accommodating an occupant. Each seat cushion 102 may additionally comprise a seat bottom, illustrated as seat bottom cushions 102a, 102c, 102e, 102g and a seat back, illustrated as seat back cushions 102b, 102d, 102f, 102h. It should be appreciated that in various examples, the seat bottoms and/or the seat backs may be formed as part of the seat cushion as a single integral piece or formed as two or more pieces that are, for example, separately moveable. The seat bottoms and/or seat backs in examples may also be formed as part of the seat tub 104 or designed in any other suitable manner that enables each vehicle seat space or vehicle seat to be adjusted so that a feature associated with the body of the occupant can be moved into a safe zone of interaction with a deployed airbag or expandable bladder, as described herein. In various examples, the vehicle seats or vehicle seat spaces herein may not comprise any cushions at all, or comprise multiple and/or modular cushions. For instance, seat cushion 102 may comprise a first seat bottom cushion for a first seat space, such as seat space 108a, a second seat bottom cushion for a second seat space, such as seat space 108b, as well as first and second seat back cushions for the respective first and second seat spaces. In examples, the seat backs and seat bottoms may be formed integrally as a single cushion or separately.

In some examples, the vehicle seat adjustment mechanism 125 may comprise one or more inflatable bladders 110a-110h. Additionally, the vehicle seat adjustment mechanisms herein may comprise any finite number adjustment mechanisms and is not limited to the adjustment mechanisms shown herein. In examples, the inflatable bladders 110a-110h may be disposed under seat cushion 102 (e.g., bladders 110a-110d) and/or behind seat cushion 102 (e.g., bladders 110e-110h). Additionally or alternatively, inflatable bladders 110a-110h may be disposed under or behind seat tub 104. Additionally, or alternatively, inflatable bladders 110a, 110d may be disposed under seat spaces 108a, 108d, respectively, and inflatable bladders 110b, 110c may be disposed under seat spaces 108b, 108c, respectively.

In some examples, inflatable bladders 110a-110h may each comprise multiple inflatable bladders or multiple inflatable chambers within a respective inflatable bladder. In some examples, certain one(s) of the multiple inflatable bladders or chambers may be inflated during a collision and/or a predicted collision (e.g., chambers located in a seat bottom located closer to an occupant's feet or knees) to adjust a restraint surface angle associated with at least one of seat spaces 108a-108d, seat cushion 102 and/or seat tub 104. Again, various examples of adjusting restraint surface angles during a collision and/or a predicted collision are described in U.S. Pat. No. 11,077,816, the entire contents of which is incorporated herein for all purposes. In some examples, any of the inflatable bladders herein including inflatable bladders 110a-110h may comprise or be constructed in whole or in part of steel (e.g., carbon steel, stainless steel, or other steel alloy), aluminum or aluminum alloy, rubber, nylon, polyamide, or another material.

In some examples, the vehicle seat adjustment mechanisms herein may also comprise one ore more actuators to adjust a position of the vehicle seats 102. For instance, the example vehicle seat adjustment mechanism 125 comprising inflatable bladders 110a-110h as shown in FIGS. 1-6B may comprise an inflation-type actuator, such as inflators 153a or 153b. In some examples, one or more of the inflators 153a, 153b may be actuated to fill at least one of the inflatable bladders 110a-110h based upon the vehicle seat adjustment control system 127 determining that a feature associated with a body of an occupant 109 sitting in vehicle seat 101a and/or 101b is located outside a zone for safe impact with a deployed expandable bladder or airbag, as described herein. One or more of the inflators 112a, 112b may be actuated to fill at least one of the inflatable bladders 110a-110h with a gas or fluid. In some examples, inflators 153 may implement a pyrotechnic reaction to create a gas or fluid for inflating inflatable bladders 110a-110h. By way of example and not limitation, the gas or fluid may comprise nitrogen gas, air, carbon dioxide, hydraulic fluid, or any other working fluid. It should be appreciated that while inflators illustrated in FIGS. 2 and 3 include two inflators 153a, 153b, any suitable number of inflators may be employed to adequately inflate the inflatable bladders to adjust a position of a seated occupant. In various examples, inflator 153a may comprise two inflators, one of which supplies gas or fluid to bladders 110e, 110f in one flow direction, and another inflator that supplies gas or fluid to bladders 110a, 110b in another flow direction. Similarly, inflator 153b in various examples, may comprise two inflators, one of which supplies gas and/or other fluid to bladders 110e, 110f in one flow direction, and another inflator that supplies gas and/or fluid to bladders 110a, 110b in another flow direction.

In examples where the vehicle seat adjustment mechanism comprises one or more inflatable bladders, such as the examples shown in FIGS. 1-6B, the vehicle seat adjustment mechanism 125 may further comprise one or more bladder inflation tubes or fluid conduits, such as bladder inflation tubes 157. The bladder inflation tubes 157 may be in fluid communication with inflatable bladders 110a-110h. In some examples, the bladder inflation tube 157 may comprise a manifold disposed between bladder inflation tube 157 and inflator 153 to allow gas and/or fluid to freely flow from an inflator 112a to inflatable bladders 110a-110h and thus the inflatable bladders 110a-110h may be inflated at the same time and from a same inflator 112a. It should be appreciated that various examples of the vehicle seat adjustment mechanism 125 may further comprise one or more valves, e.g., valves positioned in tubes 157 to control, restrict or allow fluid or gas to flow between various bladders or chambers.

Figure 5A:
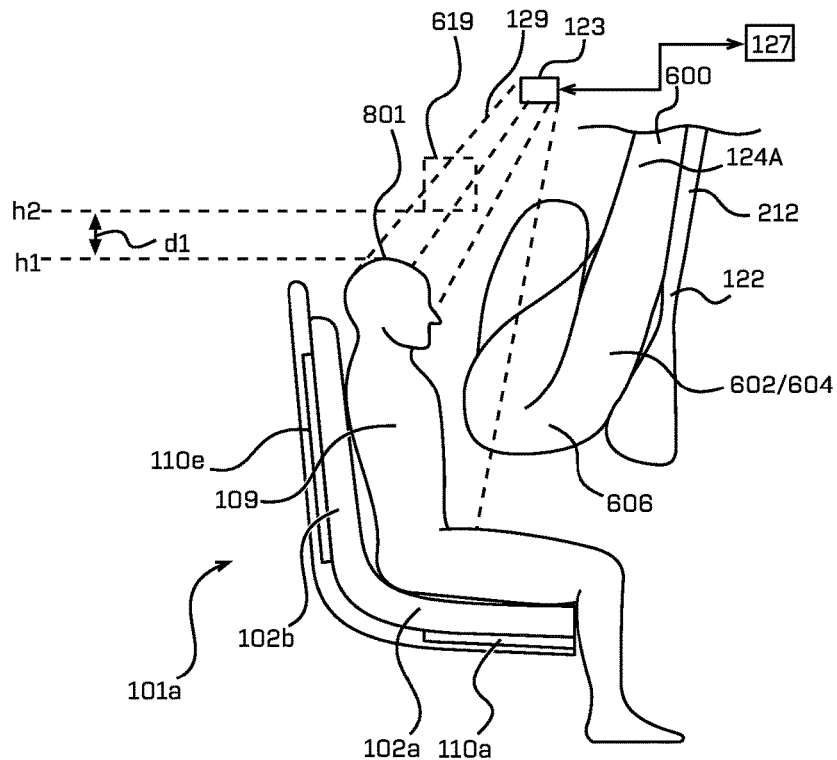
FIG. 5A is a schematic illustration of an example vehicle seat and vehicle seat adjustment mechanism in which an occupant is in an initial seated position and a feature associated with a body of the occupant is located outside a safe zone for interaction with an airbag or expandable bladder in the deployed state.
Figure 5B:
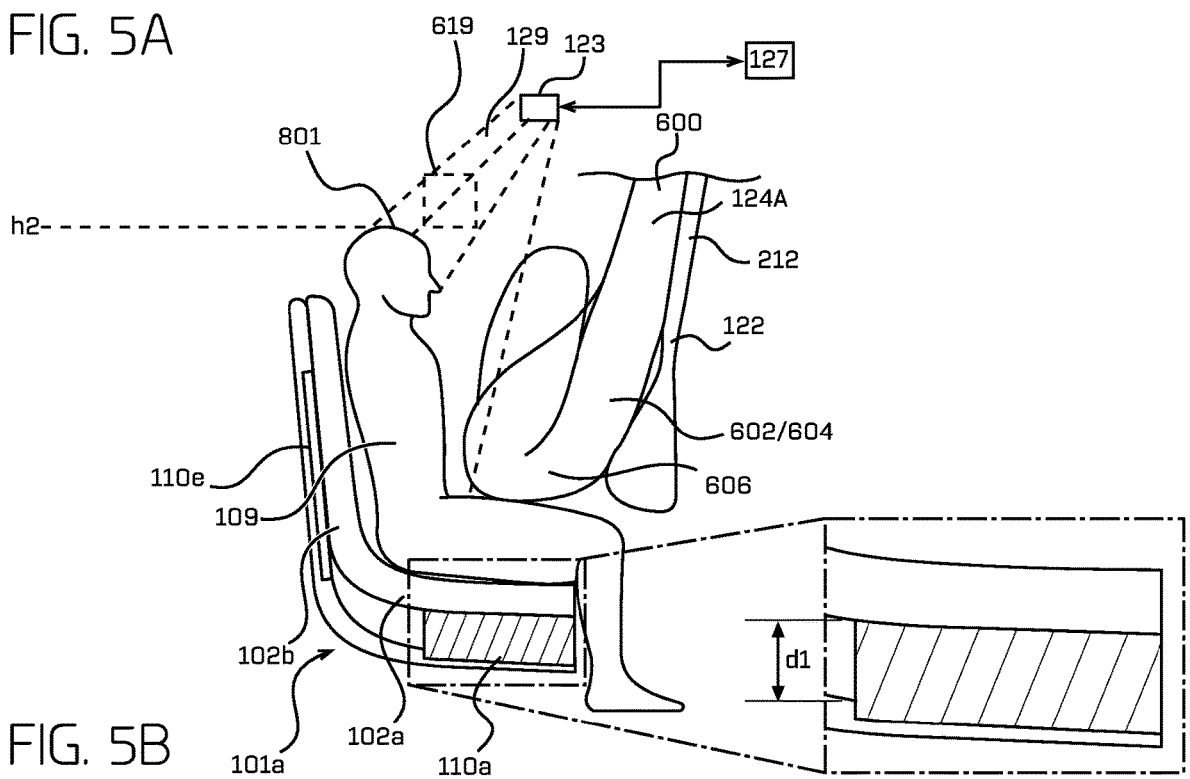
FIG. 5B is a schematic illustration of the example vehicle seat and vehicle seat adjustment mechanism of FIG. 5A in which the vehicle seat adjustment mechanism adjusted the vehicle seat height upwardly so that the feature associated with a body of the occupant is located within the safe zone for interaction with the airbag or expandable bladder in the deployed state.

Turning now to FIGS. 5A and 5B, FIG. 5A is a schematic illustration of an example vehicle seat 101a and a vehicle seat adjustment mechanism 125 in which the occupant 109 of the vehicle is in an initial seated position and the vehicle seat adjustment control system 127 determines that a feature associated with the body of the occupant 109 is located outside a safe zone 619 for interaction or impact with the airbag or expandable bladder 124A or airbag in a deployed state. FIG. 5B is a schematic illustration of the example vehicle seat 101a and vehicle seat adjustment mechanism of FIG. 5A in which the vehicle seat adjustment control system 127 causes the vehicle seat adjustment mechanism 125 to adjust the vehicle seat 101a upwardly (which could also be adjusted downwardly in examples) so that the feature associated with the body of the occupant 109 is located within the safe zone 619 for interaction with the airbag in the deployed state.

It should be appreciated that in these examples, while the occupant 109 of the vehicle is shown schematically in a position relative to the airbag or expandable bladder 124A in a deployed state, the occupant 109 is not shown as having moved forward due to a collision or an expected collision, e.g., in a longitudinal or horizontal direction from left to right in FIGS. 5A, 5B. In other words, while airbag 124A is illustrated in the deployed state, FIGS. 5A and 5B do not reflect any urging forward or forward movement of occupant 109 due to a collision or expected collision because FIGS. 5A and 5B are intended to illustrate the position of occupant 109 when first seated in the vehicle seat 101a (FIG. 5A) as well as a position of occupant 109 after the vehicle seat 101a has moved upwardly (FIG. 5B), both of which are prior to any movement of occupant 109 caused by a collision or expected collision. The airbag 124A is shown in the deployed state to aid in understanding the position in which the feature of the body of the occupant 109 should be located to fall within a safe zone 619 of interaction or impact relative to the airbag 124A in a deployed state. As mentioned, the safe zone 619 of interaction, e.g., in examples may comprise or be defined by a space in which a feature associated with the body of the occupant 109 when seated should be located to be considered safe for interacting or impacting an expandable bladder or airbag in the event the airbag is deployed, such as in the event of a collision or an expected collision. In the illustrated examples of FIGS. 5A and 5B, the feature associated with the body of the occupant 109 is a top of the head 801 or a height of the top of the head 801.

Referring more specifically to the operation illustrated by the examples of FIGS. 5A and 5B, FIG. 5A shows vehicle camera sensor 123 having a field of view 129. The camera 123 generates one or more signals associated with the occupant 109, e.g., a signal associated with a top of the head 801 of occupant 109. The vehicle seat adjustment control system 127 receives the signal(s) and determines a feature of the body associated with the occupant 109 is located outside the safe zone 619 for interaction with the airbag or expandable bladder 124A if the airbag were in a deployed state. In this example, the vehicle seat adjustment control system 127 determines that the top of the head 801 of occupant 109 is at a height h1 located outside the safe zone 619 by a distance d1 (FIG. 5A). The vehicle seat adjustment control system 127 thus causes the vehicle seat adjustment mechanism 125 to adjust a height or vertical position of the vehicle seat 101a upwardly by the distance d1 (FIG. 5B) so that the height h2 of the top of the head 801 of the occupant 109 falls within the safe zone 619. It should be appreciated that the distance d1 may be in various examples slightly greater than a distance to reach the bottom horizontal edge or side of the safe zone 619 to ensure that the feature associated with the body of occupant 109 is indeed safely located within the safe zone 619. In other examples, the distance d1 may be any suitable distance that positions the feature associated with the body above the top horizontal edge or side of safe zone 619. The vehicle seat adjustment control system 127 in the examples of FIGS. 5A and 5B causes the inflatable bladder 110a to expand or inflate to thereby cause the vehicle seat 101a to move upwardly by the distance d1., e.g., causes at least vehicle seat cushion 102a to move upwardly. It should thus be appreciated that in various examples the vehicle seat bottom cushion 102a or any other suitable vehicle seat bottom may be integral with or separately moveable from a vehicle seat back cushion 102b or any other suitable vehicle seat back design. That is, the seat bottom may move independently from any movement of the seat back or be integral with or otherwise attached to any seat back and thus move together with any seat back.

Figure 6A:
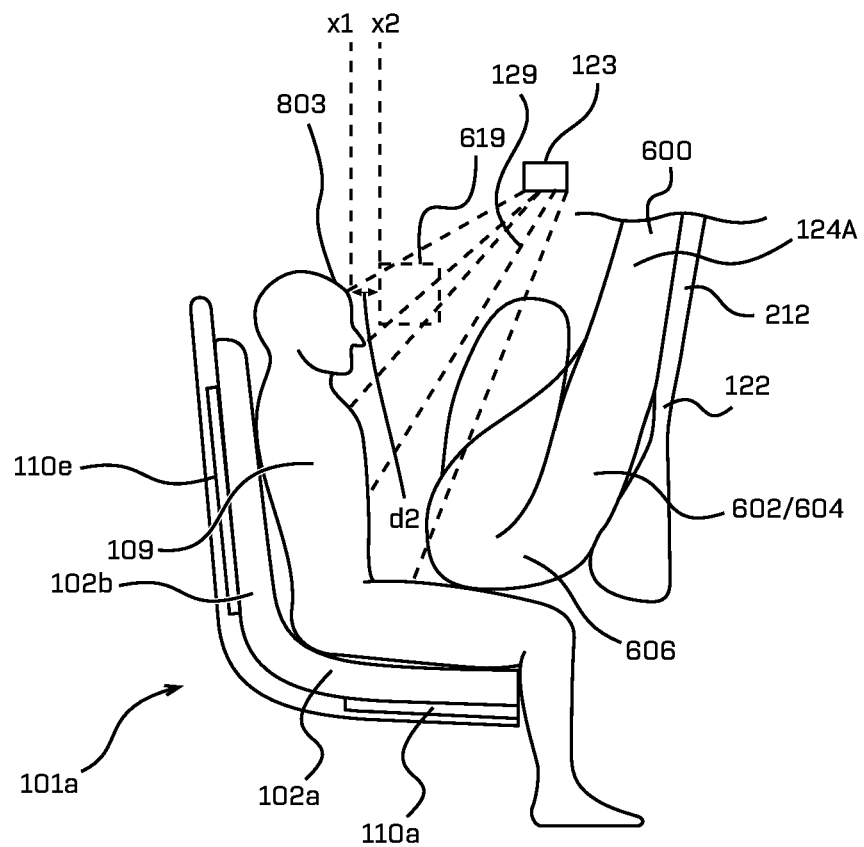
FIG. 6A is a schematic illustration of an example vehicle seat and vehicle seat adjustment mechanism in which an occupant is in an initial seated position and a feature associated with the body of the occupant is located outside a safe zone for interaction with an airbag or expandable bladder in a deployed state.
Figure 6B:
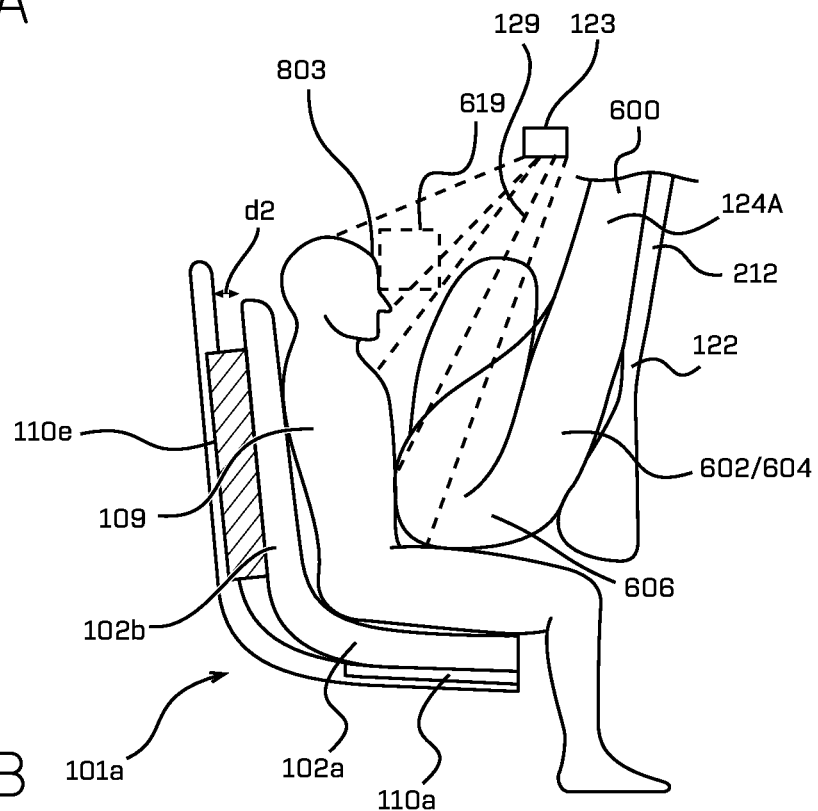
FIG. 6B is a schematic illustration of the example vehicle seat and vehicle seat adjustment mechanism of FIG. 6A in which the vehicle seat adjustment mechanism adjusted the vehicle seat to a position in which the feature associated with the body of the occupant is located within the safe zone for interaction with the airbag or expandable bladder in the deployed state.

Turning now to the examples illustrated by FIGS. 6A and 6B, FIG. 6A is similar to FIG. 5A in that it is a schematic illustration of an example vehicle seat 101a and vehicle seat adjustment mechanism 125 in which the occupant 109 of the vehicle is in an initial seated position and the vehicle seat adjustment control system 127 determines that a feature associated with the body of occupant 109 is located outside a safe zone 619 for interaction or impact with the airbag or expandable bladder 124A or airbag in a deployed state. Similarly, FIG. 6B is like FIG. 5B in that it is a schematic illustration of the example vehicle seat 101a and vehicle seat adjustment mechanism 125 in which the vehicle seat adjustment control system 127 causes the vehicle seat adjustment mechanism 125 to adjust the vehicle seat 101a so that the feature associated with the body of occupant 109 is located within the safe zone 619 for interaction with the expandable bladder or airbag in the deployed state. The examples of FIGS. 6A and 6B differ from FIGS. 5A and 5B primarily in that the vehicle seat adjustment control system 127 (i) determines a different feature associated with the body of occupant 109 (e.g., a forehead 803) is located outside a safe zone 619 of interaction with the airbag 124A in the deployed state, and (ii) causes the vehicle seat adjustment mechanism 125 to adjusts the position of the vehicle seat 101a in a different direction, e.g., in a longitudinal or horizontal position so that the feature associated with the body of occupant 109 is located within the safe zone 619 of interaction with the airbag 124A.

It should be appreciated that like FIGS. 5A and 5B, in the examples illustrated by FIGS. 6A and 6B, while the occupant 109 of the vehicle is shown schematically in a seated position relative to the airbag or expandable bladder 124A in a deployed state, the occupant 109 is not illustrated as having moved forward due to a collision or an expected collision, e.g., in a longitudinal direction from left to right in FIGS. 6A, 6B. In other words, while the airbag 124A is illustrated in the deployed state, FIGS. 6A and 6B do not reflect any urging forward or forward movement of occupant 109 due to a collision or an expected collision because FIGS. 6A and 6B are intended to illustrate the position of the occupant 109 when first seated in vehicle seat 101a (FIG. 6A), as well as a position of occupant 109 seated in the vehicle seat 101a after the vehicle seat 101a has moved upwardly (FIG. 6B), both of which are prior to any movement of occupant 109 caused by a collision or an expected collision. The airbag 124A is shown in the deployed state to aid in understanding the position in which the feature of the body of occupant 109 should be located to fall within a safe zone 619 of interaction or impact relative to the expandable bladder 124A in a deployed state. As mentioned, the safe zone 619 of interaction, e.g., in examples, may comprise, or be defined by, a space in which a feature of the body associated with the seated occupant 109 should be located when seated to be considered safe for interacting or impacting an airbag in the event that the airbag is deployed, such as in the event of a collision or an expected collision. In the illustrated examples of FIGS. 6A and 6B, the feature associated with the body of occupant 109 is a forehead 803 of the occupant 109 (e.g., the most forward-facing point of the forehead of occupant 109).

Referring more specifically to the operation illustrated by the examples of FIGS. 6A and 6B, FIG. 6A shows vehicle camera sensor 123 having a field of view 129. The camera 123 generates one or more signal associated with the occupant 109, e.g., signal(s) associated with the head of the occupant 109. The vehicle seat adjustment control system 127 receives the signal(s) to determine a feature associated with the body of occupant 109 falls outside the safe zone 619 for interaction with the airbag 124A. In this example, the vehicle seat adjustment control system 127 determines that the feature of the forehead 803 of occupant 109 (e.g., the most forward position of the forehead) is at a horizontal or longitudinal position x1 located outside the safe zone 619 by a distance d2 (FIG. 6A). The vehicle seat adjustment control system 127 thus causes the vehicle seat adjustment mechanism 125 to adjust a horizontal or longitudinal position of the vehicle seat 101a by the distance d2 so that the feature 803 of the body of the occupant 109 is located at a horizontal or longitudinal position x2 (FIG. 6B). It should be appreciated that the distance d2 may be in various examples be greater than the distance to reach the nearest vertical edge or side of the safe zone 619 (illustrated as the left edge or side of the four edges or sides of zone 619 illustrated in FIGS. 6A and 6B) to ensure that the feature associated with the body of occupant 109 (e.g., feature 803) indeed lies within the safe zone 619. In other examples, the distance d2 may be any distance that falls within the two opposite vertical edges or sides of safe zone 619. The vehicle seat adjustment control system 127 in the examples of FIGS. 6A and 6B causes inflatable bladder 110b to expand or inflate to thereby cause the vehicle seat 101a to move at least substantially in a horizontal or longitudinal direction by the distance d2., e.g., causes at least a portion of the vehicle seat back cushion 102b to move in that direction. It should be appreciated that in various examples the vehicle seat back cushion 102b or any other suitable vehicle seat back or seat back cushion herein may be rotated, pivoted or otherwise moved so that the vehicle seat 101a is positioned horizontally in a way that the feature associated with the body of occupant 109 (e.g., the forehead 803) is located within the safe zone 619 of interaction. It should also be appreciated that the seat back in various examples may be integral with or separately moveable from the vehicle seat bottom. That is, the vehicle seat back may move independently from any movement of the seat bottom or be integral with the seat bottom and thus move together with any seat bottom.

It should be appreciated from the foregoing that in various vehicle and occupant protection systems herein, the vehicle seat adjustment control systems may be configured to enable the vehicle seat adjustment mechanism to adjust vehicle seat positions according to the comfort or preferences of particular occupants of the vehicle. The adjustment of vehicle seat positions for occupant comfort or preference may be manual and/or automatic in examples. In other examples, the vehicles and occupant protection systems herein may comprise vehicle seat adjustment control systems configured so as to disable the vehicle seat adjustment mechanism altogether, e.g., upon installation or detection of a child (or infant) car seat in the vehicle. In other examples, upon installation or detection of a child (or infant) seat in the vehicle, the vehicle seat adjustment control systems herein may be configured to adjust the position of the vehicle seat to a nominal safe position to ensure the car seat is maintained at a nominal safe position vertically or horizontally relative to an airbag in a deployed position (e.g., via adjusting the vehicle seat upwardly and/or downwardly, and/or adjusting the vehicle seat backwards and/or forwards to reach a safe position relative to an airbag).

Figure 7:
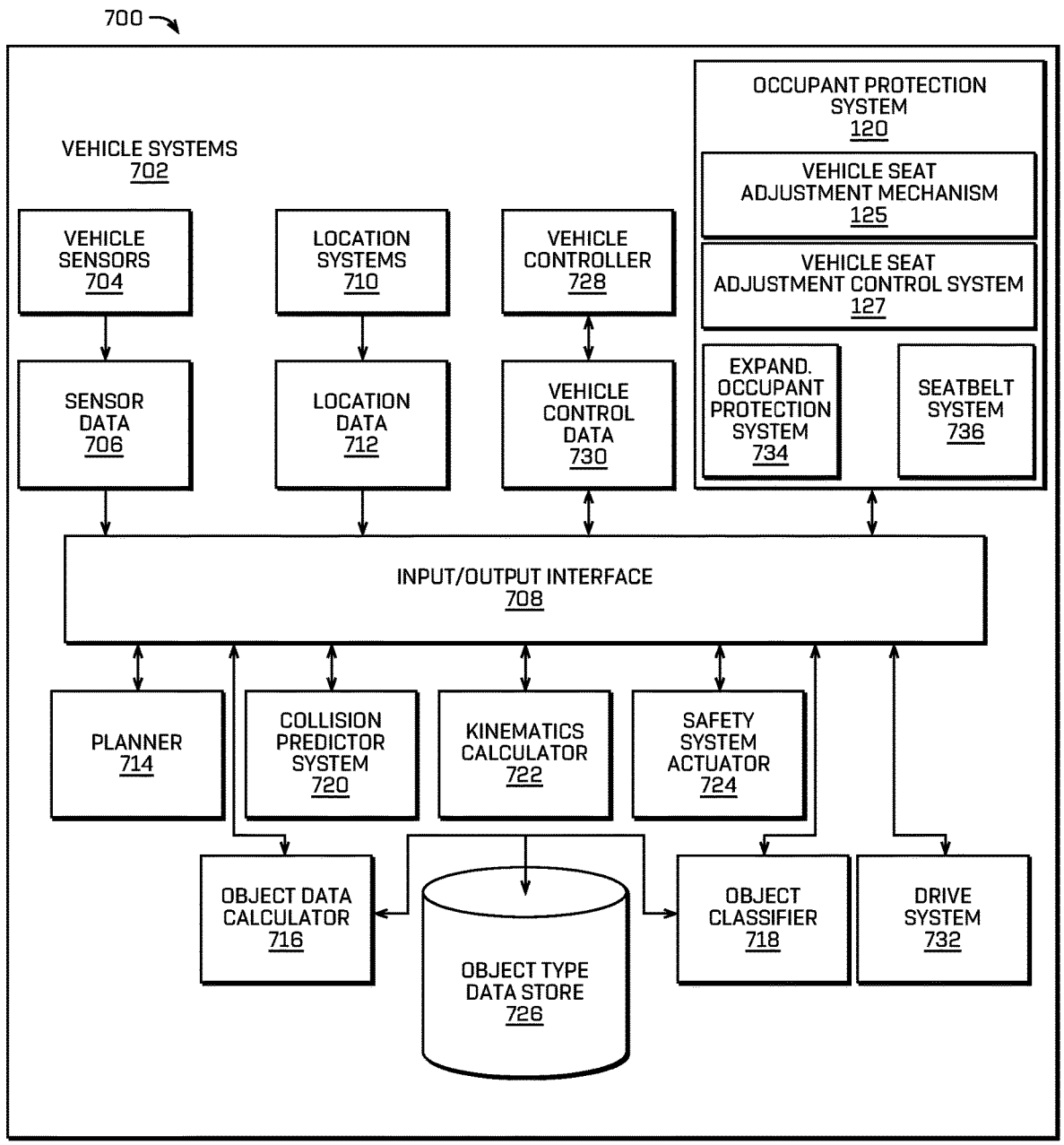
FIG. 7 is a block diagram showing an example architecture for vehicle systems including an example occupant protection system.

FIG. 7 is a block diagram of an example architecture 700 including vehicle systems 702 for controlling operation of the systems that provide data associated with operation of the vehicle 103, and that control operation of the vehicle 103. In various implementations, the architecture 700 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA. In some examples, the processor(s) may include a central processing unit (CPU), a graphics processing unit (GPU), or a combination thereof.

The example architecture 700 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the architecture 700 via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In some implementations, the I/O interface may be configured to coordinate I/O traffic between the processor(s), the non-transitory computer readable media, and any peripheral devices, the network interface, or other peripheral interfaces, such as input/output devices. In some implementations, the I/O interface may perform any necessary protocol, timing, or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example architecture 700 shown in FIG. 7, the example vehicle systems 702 include a plurality of vehicle sensors 704, for example, configured to sense movement of the vehicle 103 through the environment, sense environmental data, such as the ambient temperature, pressure, and humidity, and/or sense objects in the environment surrounding the vehicle 103. In some examples, the vehicle sensors 704 may include sensors configured to identify a location on a map. The vehicle sensors 704 may include, for example, one or more light detection and ranging sensors (LIDAR), one or more cameras, one or more radio detection and ranging sensors (RADAR), one or more ultrasonic transducers, one or more microphones for sensing sounds in the environment, such as sirens from law enforcement and emergency vehicles, and other sensors related to the operation of the vehicle 103. Other sensors may include a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The vehicle sensors 704 may also include, for example, inertial measurement units (IMUs), accelerometers, and gyroscopes. The vehicle sensors 704 may also include sensors configured to generate signal(s) associated with an occupant seated on a vehicle seat in the vehicle 103, e.g., sense or generate a signal indicative of a characteristic associated with occupant 109 seated in one or more of vehicle seats 101a or 101b as described and illustrated, for example, in FIGS. 1-6B. The vehicle sensors 704 configured to generate signal(s) associated with the seated occupant may comprise one or more vehicle camera, camera or image system in various examples, such as camera(s) 123 illustrated in FIGS. 1-6B. In other examples, the vehicle sensors 704 configured to generate signal(s) associated with the seated occupant may comprise in addition to, or alternative to, the one or more cameras, one or more pressure sensors and/or one or more weight sensors. It should be appreciated that the vehicle sensors 704 configured to generate signal(s) associated with the seated occupant may be any suitable vehicles sensor(s) configured to generate signal(s) that can be used to determine whether a feature of the body associated with the seated occupant is located outside a safe zone of interaction with an airbag or deployed expandable bladder of the occupant protection system 120 as described herein. Such vehicle sensors 704 may be configured to provide sensor data 706 representative of the occupants or characteristics of the occupant seated in the vehicle 103 and provide such data or signals to the vehicle systems 702 via, for example, an input/output (I/O) interface 708. Other types of sensors and sensor data are contemplated.

The example vehicle systems 702 also include location systems 710 configured to receive location information, including position and orientation data (e.g., a local position or local pose) from the vehicle sensors 704 and/or external sources, and provide location data 712 to other portions of the vehicle systems 702 via the I/O interface 708. The external sources may include global satellites for facilitating operation of a global positioning system (GPS) and/or a wireless network for communicating and receiving information related to the vehicle's location, such as map data. The location systems 710 may also include sensors configured to assist with navigation of the vehicle 103, such as wheel encoders for sensing the rotation of the wheels, inertial navigation sensors, such as gyroscopes and/or accelerometers, and/or cameras, LIDAR, RADAR, etc. for obtaining image data for dead-reckoning navigation and/or SLAM-based approaches to localization.

The example vehicle systems 702 may also include one or more of a planner 714, an object data calculator 716, an object classifier 718, a collision predictor system 720, a kinematics calculator 722, and a safety system actuator 724. The vehicle systems 702 may be configured to access one or more data stores including, but not limited to, an object type data store 726 or any other data stores such as a data store having information related to (i) passenger or occupant profiles including profiles related to a variety of passenger heights, weights, or other information related to aspects of passengers body features, and (ii) a variety of expandable bladders or airbags of occupant protection systems, e.g., vertical lengths of various airbags in various deployed states, one or more horizontal or longitudinal positions of various airbags in various deployed states and thus comprise information related to safe zones of interaction or impact for such airbags. The object type data store 726 may include data representing object types associated with object classifications for objects detected in the environment.

The example vehicle systems 702 shown in FIG. 7 also include a vehicle controller 728 configured to receive vehicle control data 730, and based on the vehicle control data 730, communicate with a drive system 732 (e.g., a steering system, a propulsion system, suspension system, and/or a braking system) to control operation of the vehicle 103. For example, the vehicle control data 730 may be derived from data received from one of more of the vehicle sensors 704 and one or more of the planner 714, the object data calculator 716, the object classifier 718, the collision predictor system 720, the kinematics calculator 722, and the safety system actuator 724, and control operation of the drive system 732, so that operation and maneuvering of the vehicle 103 is executed.

In some examples, the planner 714 may be configured to generate data representative of a trajectory of the vehicle 103, for example, using data representing a location of the vehicle 103 in the environment and other data, such as local pose data, that may be included in the location data 712. In some examples, the planner 714 may also be configured to determine projected trajectories predicted to be executed by the vehicle 103. The planner 714 may, in some examples, be configured to calculate data associated with a predicted motion of an object in the environment, and may determine a predicted object path associated with the predicted motion of the object. In some examples, the object path may include the predicted object path. In some examples, the object path may include a predicted object trajectory. In some examples, the planner 714 may be configured to predict more than a single predicted object trajectory. For example, the planner 714 may be configured to predict multiple object trajectories based on, for example, probabilistic determinations or multimodal distributions of predicted positions, trajectories, and/or velocities associated with an object.

In some examples, the object data calculator 716 may be configured to provide data representative of, for example, one or more of the location of an object in the environment surrounding the vehicle 103, an object track associated with the object, and an object classification associated with the object. For example, the object data calculator 716 may be configured to receive data in the form of sensor signals received from one or more of the vehicle sensors 704 and determine data representing one or more of the location in the environment of the object, the object track, and the object classification.

In some examples, the object classifier 718 may be configured to access data from the object type data store 726, which may be configured to store data representing object types, such as, for example, a species of an object classification, a subclass of an object classification, and/or a subset of an object classification. The object classifier 718, in some examples, may be configured to analyze data representing an object track and data representing an object classification with data representing an object type, and determine an object type based at least in part on the object track and classification data. For example, a detected object having an object classification of an "automobile" may have an object type of "sedan," "coupe," "hatch-back," "sports utility vehicle," "pick-up truck," or "minivan." An object type may include additional subclasses or subsets. For example, a "sedan" that is parked may have an additional subclass designation of being "static" or being "dynamic" if moving.

In some examples, the collision predictor system 720 may be configured to use the data representing the object type, the data representing the trajectory of the object, and/or the data representing the trajectory of the vehicle 103, to predict a collision between the vehicle 103 and the object.

In some examples, the kinematics calculator 722 may be configured to determine data representing one or more scalar and/or vector quantities associated with motion of objects in the environment, including, but not limited to, velocity, speed, acceleration, deceleration, momentum, local pose, and/or force. Data from the kinematics calculator 722 may be used to compute other data, including, but not limited to, data representing an estimated time to impact between an object and the vehicle 103, and data representing a distance between the object and the vehicle 103. In some examples, the kinematics calculator 722 may be configured to predict a likelihood that other objects in the environment (e.g., cars, motorcyclists, pedestrians, cyclists, and animals) are moving in an alert or controlled state, versus an un-alert or uncontrolled state. For example, the kinematics calculator 722 may be configured estimate the probability that other objects are moving as though they are being controlled and/or are behaving in a predictable manner, or whether they are not being controlled and/or behaving in an unpredictable manner, for example, by observing motion of the object over time and relative to other objects in the environment. For example, if the objects are moving erratically or without appearing to adjust to the presence or motion of other objects in the environment, this may be an indication that the objects are either uncontrolled or moving in an unpredictable manner. This may be inferred based on sensor data received over time that may be used to estimate or predict a future location of the object relative to a current or future trajectory of the vehicle 103.

In some examples, the safety system actuator 724 may be configured to activate one or more safety systems of the autonomous vehicle 103 when a collision is predicted by the collision predictor 720 and/or the occurrence of other safety related events, such as, for example, an emergency maneuver by the vehicle 103, such as hard braking or a sharp acceleration. The safety system actuator 724 may be configured to activate an interior safety system (e.g., including sending one or more signals to the vehicle seat adjustment control system 127 and the deployment control system 126 of the occupant protection system 120), an exterior safety system (e.g., including warning sounds and/or warning lights), the drive system 732, which may be configured to execute an emergency maneuver to avoid a collision, and/or any combination thereof. For example, the drive system 732 may receive data for causing a steering system of the vehicle 103 to change the travel direction of the vehicle 103, and a propulsion system of the vehicle 103 to change the speed of the vehicle 103 to alter the trajectory of vehicle 103 from an initial trajectory to a trajectory for avoiding a collision.

Some examples of the vehicle systems 702 may operate according to the following example. Data representing a trajectory of the vehicle 103 in the environment may be received by the vehicle controller 728. Object data associated with an object in the environment may be calculated. Sensor data 706 from one or more of the vehicle sensors 704 may be used to calculate the object data. The object data may include data representing the location of the object in the environment, an object track associated with the object, such as whether the object is stationary or moving, and an object classification associated with the object, such as whether the object is another vehicle, a pedestrian, a cyclist, an animal, or a stationary object. In some examples, the object data calculator 716, based on the object data, may be used to determine data representing the object's location in the environment, data representing whether the object is moving, and data representing a classification associated with the object.

In some examples, the planner 714 may use the object data to determine a predicted path of the object in the environment, for example, based on data representing the location of the object and may process that data to generate data representing a predicted object path. Data representing the type of object may be determined based on the data representing whether the object is moving, data representing the object's classification, and/or data representing object's type. A pedestrian not in motion, a vehicle in motion, and traffic sign, a lane marker, or a fire hydrant, none of which is in motion, are examples of object types with an associated motion data.

In some examples, the collision predictor system 720 may be used to predict a collision between the vehicle 103 and an object in the environment based on the object type, whether the object is moving, the trajectory of the vehicle 103, the predicted path of the object obtained from the planner 714. For example, a collision may be predicted based in part on the object type due to the object moving, the trajectory of the object being in potential conflict with the trajectory of the vehicle 103, and the object having an object classification that indicates the object is a likely collision threat.

In some examples, the safety system actuator 724 may be configured to actuate one or more portions of a safety system of the vehicle 103 when a collision is predicted or when there is some type of safety issue, e.g., an occupant is not seated in a vehicle seat at a proper position relative to an expandable bladder if the expandable bladder were to deploy. For example, the safety system actuator 724 may activate one or more safety systems of the vehicle 103, such as, for example, one or more of the interior safety systems, one or more of the exterior safety systems, and one or more of the components of the drive system 732 (e.g., the steering system, the propulsion system, and/or the braking system) via the vehicle controller 728. In some examples, the vehicle controller 728 may determine that the interior safety system will be activated based on some action of an object in the environment, and the vehicle control data 730 may include information configured to cause the vehicle controller 728 to activate one or more functions of the interior safety system, the exterior safety system, and the drive system 732.

As shown in FIG. 7, the example vehicle systems 702 also include the occupant protection system 120, which may operate as described herein. In some examples, the occupant protection system 120 may include an expandable occupant protection system 734, a seatbelt system 736, a vehicle seat adjustment control system 127 and a vehicle seat adjustment mechanism 125, which may be in communication with other vehicle systems 702 via the input/output interface 708. For example, the occupant protection system 120 may be in communication with the safety system actuator 724, and the deployment control system 126 and the vehicle seat adjustment control system 127 may receive one or more signals from the vehicle systems 702 and activate the portions of the expandable occupant protection system 734 and the vehicle seat adjustment mechanism 125, respectively, for example, as described herein.

Figure 8:
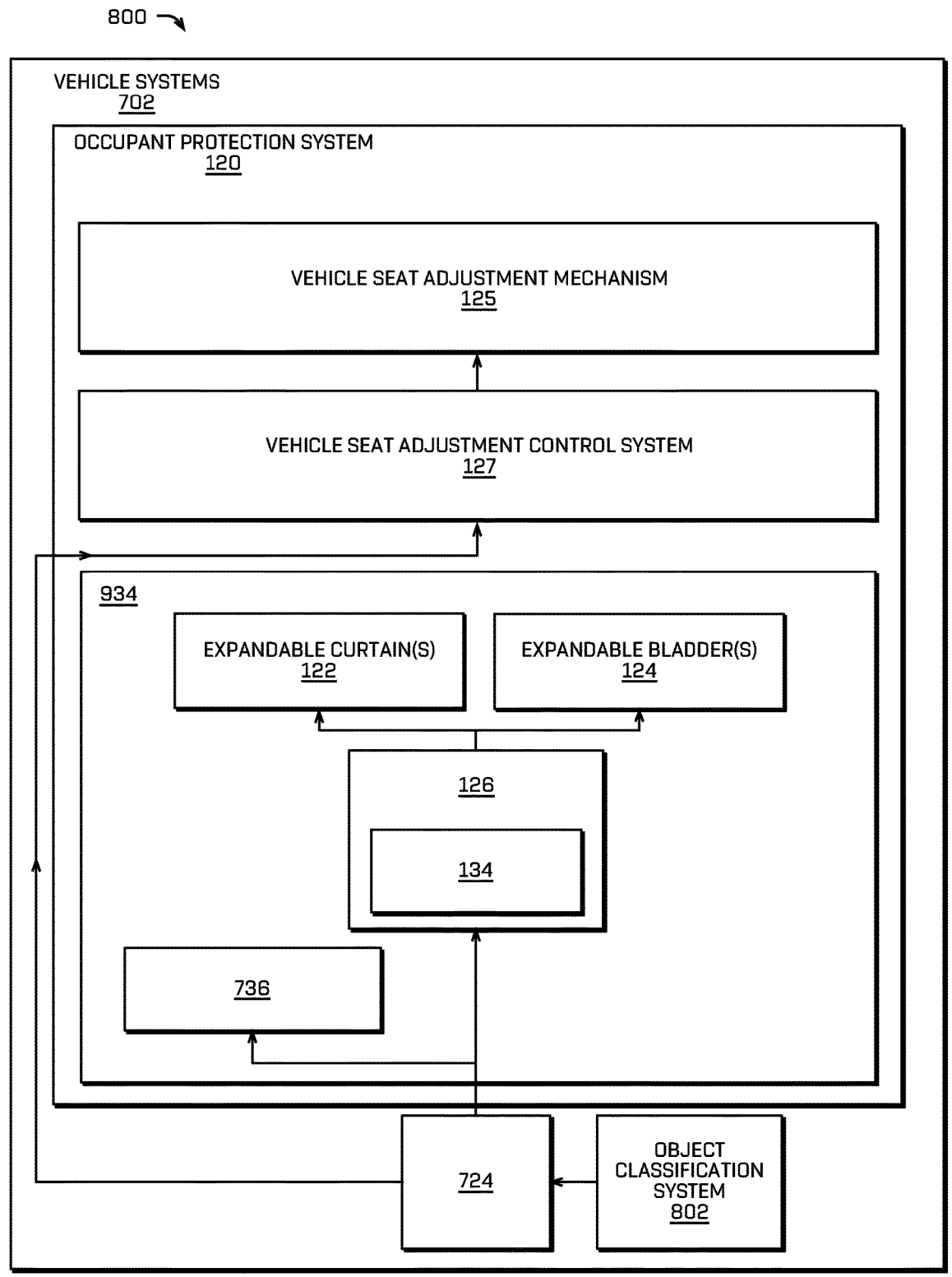
FIG. 8 is a block diagram including an example architecture for an example occupant protection system.

FIG. 8 shows an example architecture 800 including the vehicle systems 702 and the example occupant protection system 120. In the example shown, the example occupant protection system 120 includes an expandable occupant protection system 734, a vehicle seat adjustment mechanism 125, a vehicle seat adjustment control system 127, which controls operation of the vehicle seat adjustment mechanism 125, and a seatbelt system 736, which controls operation of systems related to the seatbelts in the vehicle 103. In the example shown, the expandable occupant protection system 734 may include one or more expandable curtains 122 and one or more airbags or expandable bladders 124, for example, airbags or expandable bladders 124A, 124B, as described herein. The expandable curtain(s) 122 may include one or more of a first side 204, a second side 210, and a transverse portion 212 extending between the first side 204 and second side 210 and, in some examples, coupling the first and second sides 204 and 210 to one another. In various examples, the expandable bladder(s) 124 may include one or more of a first initial expandable chamber and a second occupant restraining expandable chamber as described in U.S. application Ser. No. 17/555,206, the entire contents of which is incorporated herein by reference for all purposes.

As shown in the example architecture 800 of FIG. 8, the occupant protection system 120 includes the vehicle seat adjustment control system 127, which operates or is configured to control adjustment or movement of vehicle seat adjustment mechanism 125, which may comprise in examples one or more actuators (e.g., inflatable bladders including inflator type actuators) as described herein. The vehicle seat adjustment control system 127 in examples may be configured to supply a fluid or gas to inflatable bladders, for example, when activated by the vehicle seat adjustment control system 127, as described herein. In other examples, the vehicle seat adjustment control system 127 may be configured to activate any other suitable vehicle seat adjustment mechanism as described herein (including any suitable actuators) that are configured to adjust a position of a vehicle seat in vehicle 103.

In some examples, the vehicle seat adjustment control system 127 may be configured to receive one or more signals indicative of or associated with an occupant (e.g., occupant 109 in the illustrated examples) seated on a vehicle seat in a vehicle. Based upon the one or more signals, the vehicle seat adjustment control system 127 may determine a feature associated with the body of the seated occupant is outside a zone of safe interaction or impact with an expandable bladder or airbag in the deployed state, and cause the vehicle seat adjustment mechanism 125 to adjust a position of a vehicle seat in the vehicle 103 so that the feature associated with the body of the seated occupant is located within the zone of safe interaction or impact with the expandable bladder or airbag in the deployed state. In various examples, the vehicle seat adjustment control system 127 may be configured to receive signal(s) on a continuous basis from the vehicle systems, e.g., using a continuous feedback loop, regarding the speed at which the vehicle is travelling, and adjust the position of the vehicle seat based upon the speed and/or the comfort level of a seated occupant. In various examples, the vehicle seat adjustment control system 127 may receive signal(s) that the vehicle is moving at a relatively lower speed (e.g., 25 miles per hour), and cause the vehicle seat adjustment mechanism 125 to adjust the vehicle seat position (e.g., via reducing air pressure provided to one or more inflatable bladders) so that the vehicle seat is moved horizontally or vertically to a position that is further away from a zone of safe interaction with an airbag, which position an occupant may consider more comfortable. In other examples, the vehicle seat adjustment control system 127 may receive signal(s) that the vehicle is moving at a relatively higher speed (e.g., 35 miles per hour) and cause the vehicle seat adjustment mechanism 125 to adjust the vehicle seat position (e.g., via increasing air pressure to one or more inflatable bladders) so that the vehicle seat is moved horizontally or vertically to a position that is closer to a zone of safe interaction with an airbag, which position the occupant may consider less comfortable. In some examples, the vehicle systems 702 may include an object classification system 802 configured to determine information related to a seated occupant in the vehicle seat. In various examples, one or more of the vehicle sensors such as a camera, camera system or image system may merely determine the presence of an occupant in a vehicle seat. If no occupant is present, the deployment control system 126 may receive one or more signals associated with whether an occupant is in the seat, for example, via the safety system actuator 724, and based at least in part on the one or more signals, determine whether to initiate deployment of, before or during a collision, the expandable curtain 122 and/or the airbag or expandable bladder 124 associated with the seat. For example, if an occupant is not present in the seat, the deployment control system 126 may not initiate deployment of the expandable curtain 122 or the airbag or expandable bladder 124. This may prevent unnecessary deployment and prevent costs associated with servicing deployed parts of the occupant protection system 120. Alternatively, if an occupant is present in the seat, the deployment control system 126 may initiate deployment of the expandable curtain 122 and/or the airbag or expandable bladder 124 to protect the occupant during the collision.

In some examples, the deployment control system 126 may be configured to receive one or more signals indicative of whether the occupant is properly wearing a seatbelt, and cause and/or control deployment of the expandable curtain 122 and/or the airbag or expandable bladder 124 associated with the position of the occupant 109 based at least in part on the one or more signals indicative of whether the occupant is properly wearing the seatbelt. For example, the vehicle sensors 704 and/or vehicle systems 702 may determine whether the occupant is properly wearing a seatbelt. The deployment control system 126 may receive one or more such signals and, based at least in part on the signals, initiate and/or control deployment of the expandable curtain 122 and/or the airbag or expandable bladder 124 before or during a collision involving the vehicle 103.

For example, if the occupant is wearing a seatbelt, the deployment control system 126 may reduce the deployment rate and/or the deployment volume (or pressure) of the expandable curtain 122 and/or the airbag or expandable bladder 124, for example, since the seatbelt will be expected to assist with preventing injury to the occupant during the collision. If, on the other hand, the occupant 109 is not properly wearing a seatbelt, the deployment control system 126 may maintain or increase the deployment rate and/or the deployment volume (or pressure) of the expandable curtain 122 and/or expandable bladder 124, for example, since the seatbelt will not be expected to assist with preventing injury to the occupant during the collision.

In some examples, deployment of the expandable curtain 122 and/or one or more of the airbags or expandable bladders 124 may be affected by a number of parameters. For example, the deployment rate, the deployment volume (or pressure), the timing of deployment, and/or the sequence of deployment of one or more of the expandable curtain 122 or the airbag or expandable bladders 124 may be altered based at least in part on one or more parameters, such as, for example, the severity of a collision impact, whether one or more occupants is/are properly wearing a seatbelt, and/or the size and/or weight of the occupant(s) 104 (e.g., depending on whether the occupant is an adult, a child, or an infant).

In some examples, the expandable curtain 122 and one or more of the airbags or expandable bladders 124 may be deployed independently from one another. For example, the expandable curtain 122 may be deployed without deploying any of the airbags or expandable bladders 124. For example, if objects are detected in the interior 100 of the vehicle 103 and a rapid change in the speed and/or direction of travel of the vehicle 103 occurs, the expandable curtain 122 alone may be deployed to prevent objects in the vehicle 103 from being tossed around inside the vehicle 103 during the rapid change in speed and/or direction. This may be particularly useful when, for example, an occupant is in a seat facing a seat on which one or more objects have been placed. Upon the rapid change of speed and/or direction, the expandable curtain 122 may be deployed in order to prevent the one or more objects from being thrown from the seat opposite the occupant 109.

The deployment control system 126, in some examples, may be configured to receive one or more signals indicative of a direction of travel of the vehicle 103, and cause deployment of the expandable curtain 122 and/or the expandable bladder 124 based at least in part on the one or more signals indicative of the direction of travel of the vehicle 103. For example, the vehicle 103 may be a bi-directional vehicle configured to travel between locations with either end of the vehicle 103 being the leading end, for example, as described herein with respect to FIG. 1. In such vehicles, a seat may be facing the direction of travel when the vehicle 103 is traveling with one end of the vehicle being the leading end, but with the seat acing rearward with the other end of the vehicle 103 being the leading end. The vehicle 103 may include sensors and/or a system configured to generate one or more signals indicative of whether the vehicle 103 is traveling in a direction such that the seat is facing forward (i.e., along a direction of travel) or the seat is facing rearward (i.e., opposing a direction of travel). The deployment control system 126 may be configured to prevent deployment of the expandable curtain 122 and/or the expandable bladder 124 associated with the seat, even when occupied, for example, when the seat is facing rearward based at least in part on the signals. This may prevent unnecessary deployment and costs associated with servicing deployed parts of the occupant protection system 120. Alternatively, if the seat is facing forward, the deployment control system 126 may initiate deployment of the expandable curtain 122 and/or the expandable bladder 124 associated with the position of the seat to protect the occupant during the collision, for example, as described herein.

In the example architecture 800 shown in FIG. 8, the occupant protection system 120 also includes a deployment control system 126, which may include one or more inflators 134 configured to supply fluid and/or gas to the expandable curtain(s) 122 and/or the expandable bladder(s) 124, for example, when activated by the deployment control system 126, as described herein.

In some examples, the deployment control system 126 may be configured to receive a signal indicative of a predicted collision involving the vehicle 103 and/or a collision involving the vehicle 103, and cause deployment of one or more expandable curtains 122, and/or one or more airbags or expandable bladders 124 based at least in part on the signal(s). For example, the vehicle sensors 704 may provide information to the collision predictor system 720, which may predict a collision with an object in the environment through which the vehicle 103 is travelling. The collision predictor system 720 may provide information to the safety system actuator 724, which in turn, provides one or more signals to the deployment control system 126, which may activate one more inflators 134 to cause deployment of one or more expandable curtains 122 and/or one or more airbags or expandable bladders 124.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architectures 700 and 800 are merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architectures 700 and 800 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architectures 700 and 800. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architectures 700 and 800 may be transmitted to the architectures 700 and 800 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 103 is discussed herein.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for deploying an occupant protection system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

Example Clauses

A: A vehicle comprising: a vehicle seat; and an occupant protection system comprising: a vehicle sensor configured to generate a signal associated with an occupant sitting on the vehicle seat, a vehicle seat adjustment mechanism, an airbag configured to be at least partially stowed in a portion of the vehicle associated with a roof of the vehicle and configured to expand between a stowed state and a deployed state having a length that extends at least a portion of a distance between the roof and a floor of the vehicle, and a vehicle seat adjustment control system configured to: (i) receive the signal associated with the occupant sitting on the vehicle seat, (ii) based upon the received signal, (a) determine a feature associated with a body of the occupant sitting on the vehicle seat is located outside a zone of safe impact with the airbag in the deployed state, and (b) cause the vehicle seat adjustment mechanism to adjust a position of the vehicle seat so that the feature associated with the body of the occupant sitting on the vehicle seat is located within the zone of safe impact with the airbag in the deployed state.

B: A vehicle as paragraph A describes, wherein the vehicle seat adjustment control system is configured to (i) determine a position of a head of the occupant sitting on the vehicle seat is located outside the zone of safe impact with the airbag in the deployed state, and (ii) cause the vehicle seat adjustment mechanism to adjust a height of the vehicle seat such that the position of the head of the occupant sitting on the vehicle seat is located within the zone of safe impact with the airbag in the deployed state.

C: A vehicle as paragraph A describes, wherein (i) the vehicle sensor is configured to sense a position of a head of the occupant sitting on the vehicle seat, and (ii) the vehicle seat adjustment control system is configured to, based upon the sensed position of the head of the occupant sitting on the vehicle seat, determine the position of the head is outside the zone of safe impact with the airbag in the deployed state.

D: A vehicle as paragraph A describes, wherein the vehicle seat adjustment control system is configured to, based upon the received signal, (i) determine a horizontal position of the feature associated with the body of the occupant sitting in the vehicle seat is located outside the zone of safe impact with the airbag in the deployed state, and (ii) based upon the determined horizontal position of the feature associated with the body of the occupant sitting on the vehicle seat, cause the vehicle seat adjustment mechanism to adjust the position of the vehicle seat such that the horizontal position of the feature associated with the body of the occupant sitting on the vehicle seat is located within the zone of safe impact with the airbag in the deployed state.

E: A vehicle as paragraph A describes, wherein the vehicle sensor comprises at least one of (i) a pressure sensor, (ii) a camera, (iii) a weight sensor, (iv) a capacitance sensor, or (v) a laser.

F: A vehicle as paragraph A describes, wherein: (i) the vehicle seat comprises a bench seat, the bench seat comprising: a first occupant seating area configured to accommodate a first vehicle occupant, the first occupant seating area comprising a seat back and a seat bottom, and a second occupant seating area configured to accommodate a second vehicle occupant, the second occupant seating area comprising a seat back and a seat bottom, and (ii) the vehicle seat adjustment control system is configured to adjust the position of (a) the seat back of the first occupant seating area, (b) the seat bottom of the first occupant seating area, (c) the seat back of the second occupant seating area, and (d) the seat bottom of the second occupant seating area.

G: A vehicle as paragraph A describes, wherein (i) the seat adjustment mechanism comprises an inflatable bladder, and (ii) the vehicle seat adjustment control system is configured to, based upon the received signal, cause the inflatable bladder to inflate to adjust the position of the vehicle seat so that the feature associated with the body of the occupant sitting on the vehicle seat is located within the zone of safe impact with the airbag in the deployed state.

H: A vehicle occupant protection system comprising: a vehicle seat adjustment control system configured to: (i) receive from a vehicle sensor a signal associated with an occupant sitting on a vehicle seat, and (ii) based upon the received signal, (a) determine a feature associated with a body of the occupant sitting on the vehicle seat is located outside a zone of safe impact with an airbag in a deployed state, and (b) cause a vehicle seat adjustment mechanism to adjust a position of the vehicle seat so that the feature associated with the body of the occupant sitting on the vehicle seat is located within the zone of safe impact with the airbag in the deployed state.

I: The vehicle occupant protection system as described in paragraph H, further comprising: (i) the airbag, the airbag configured to be expanded between a stowed state and the deployed state, (ii) the vehicle sensor, the vehicle sensor configured to generate the signal associated with the occupant sitting on the vehicle seat, and (iii) the vehicle seat adjustment mechanism.

J: The vehicle occupant protection system as described in paragraph H, wherein the vehicle seat adjustment control system is configured to, based upon the received signal, adjust at least one of a height or a horizontal position of the vehicle seat so that the feature associated with the body of the occupant sitting on the vehicle seat is located within the safe impact zone with the airbag in the deployed state.

K: The vehicle occupant protection system as described in paragraph H, further comprising a vehicle seat adjustment mechanism, and wherein the vehicle seat adjustment control system is configured to, based upon the received signal, cause the vehicle seat adjustment mechanism to adjust a position of at least one of a seat bottom of the vehicle seat or a seat back of the vehicle seat so that the feature associated with the body of the occupant sitting on the vehicle seat is located within the safe zone of impact with the airbag in the deployed state.

L: The vehicle occupant protection system as described in paragraph H, wherein the vehicle seat adjustment control system is configured to, based upon the received signal, cause the vehicle seat adjustment mechanism to adjust a height of a seat bottom of the vehicle seat or adjust an angle of a seat back of the vehicle seat so that the feature associated with the body of the occupant sitting on the vehicle seat is located within the safe impact zone with the airbag in the deployed state.

M: The vehicle occupant protection system as described in paragraph H, wherein the vehicle adjustment control system is configured to (i) determine a height of the occupant sitting on the vehicle seat based upon the received signal, and (ii) based upon the determined height of the occupant sitting on the vehicle seat, cause the vehicle seat adjustment mechanism to adjust a height of the vehicle seat.

N: The vehicle occupant protection system as described in paragraph H, further comprising the vehicle sensor, the vehicle sensor configured to sense a height of a head of the occupant sitting on the vehicle seat, and wherein the vehicle seat adjustment control system is configured to, based upon the sensed height of the head of the occupant sitting on the vehicle seat, determine the sensed height of the head of the occupant sitting in the vehicle seat is outside the zone of safe impact with the airbag in the deployed state.

O: The vehicle occupant protection system as described in paragraph H, wherein the vehicle seat adjustment control system is configured to (i) determine a height of a head of the occupant sitting on the vehicle seat, and (ii) based upon the determined height of the head of the occupant sitting on the vehicle seat, determine the height of the head of the occupant sitting in the vehicle seat is outside the zone of safe impact with the airbag in the deployed state.

P: The vehicle occupant protection system as described in paragraph H, further comprising the vehicle sensor, and wherein the vehicle sensor comprises at least one of (i) a pressure sensor, (ii) a camera, or (iii) a weight sensor.

Q: The vehicle occupant protection system as described in paragraph H, wherein the vehicle seat adjustment control system is configured to cause the vehicle seat adjustment mechanism to adjust a position of (i) a first occupant vehicle seat area of the vehicle seat, the first occupant vehicle seat area configured to accommodate a first vehicle occupant, or (ii) a second vehicle occupant seat area of the vehicle seat, the second vehicle seat area configured to accommodate a second vehicle occupant.

R: The vehicle occupant protection system as described in paragraph H, wherein the vehicle seat adjustment control system is configured to cause the vehicle seat adjustment mechanism to adjust the position of the vehicle seat by inflating an inflatable bladder of the vehicle seat adjustment mechanism.

S: The vehicle occupant protection system as described in paragraph H, further comprising the vehicle sensor, and wherein: (i) the vehicle sensor comprises a camera configured to generate the signal associated with the occupant sitting on the vehicle seat, and (ii) the vehicle seat adjustment control system is configured to receive the signal from the camera and (a) determine a height of a top of the head of the occupant sitting in the vehicle seat is outside the zone of safe impact with the airbag in the deployed state, and (b) cause the vehicle seat adjustment mechanism to adjust a position of the vehicle seat so that the height of the top of the head of the occupant sitting on the vehicle seat is located within the safe impact zone with the airbag in the deployed state.

T: One or more non-transitory computer-readable media storing instructions executable by one or more processors, wherein the instructions, when executed, cause the one or more processors to: based upon a signal associated with an occupant sitting on a vehicle seat and received from a vehicle sensor: determine a feature associated with a body of the occupant sitting on the vehicle seat is located outside a zone of safe impact with an airbag in a deployed state, the airbag configured to be at least partially stowed in a portion of the vehicle associated with a roof of the vehicle and configured to expand between a stowed state and the deployed state having a length that extends at least a portion of a distance between the roof and a floor of the vehicle, and adjust a position of the vehicle seat so that the feature associated with the body of the occupant sitting on the vehicle seat is located within the zone of safe impact with the airbag in the deployed state.

While the example clauses described above are described with respect to one particular implementation, it should be understood that, in the context of this document, the content of the example clauses may be implemented via a method, device, system, computer-readable medium, and/or another implementation. Additionally, any of examples A-T may be implemented alone or in combination with any other one or more of the examples A-T.

What is claimed is:

1. A vehicle comprising:
   a vehicle seat; and
   an occupant protection system comprising:
      a vehicle sensor configured to generate a signal associated with an occupant sitting on the vehicle seat,
      a vehicle seat adjustment mechanism,
      an airbag configured to be at least partially stowed in a portion of the vehicle associated with a roof of the vehicle and configured to expand between a stowed state and a deployed state having a length that extends at least a portion of a distance between the roof and a floor of the vehicle, and
      a vehicle seat adjustment control system comprising at least one processor and configured to: (i) receive the signal associated with the occupant sitting on the vehicle seat, (ii) based upon the received signal, (a) determine a feature associated with a body of the occupant sitting on the vehicle seat is located outside a zone of safe impact with the airbag in the deployed state by a determined linear distance, and (b) cause the vehicle seat adjustment mechanism to adjust a position of the vehicle seat at least a distance corresponding to the determined linear distance so that the feature associated with the body of the occupant sitting on the vehicle seat is located within the zone of safe impact with the airbag in the deployed state.

2. The vehicle of claim 1, wherein the vehicle seat adjustment control system is configured to (i) determine a position of a head of the occupant sitting on the vehicle seat is located outside the zone of safe impact with the airbag in the deployed state, and (ii) cause the vehicle seat adjustment mechanism to adjust a height of the vehicle seat such that the position of the head of the occupant sitting on the vehicle seat is located within the zone of safe impact with the airbag in the deployed state.

3. The vehicle of claim 1, wherein
   (i) the vehicle sensor is configured to sense a position of a head of the occupant sitting on the vehicle seat, and
   (ii) the vehicle seat adjustment control system is configured to, based upon the sensed position of the head of the occupant sitting on the vehicle seat, determine the position of the head is outside the zone of safe impact with the airbag in the deployed state.

4. The vehicle of claim 1, wherein the vehicle seat adjustment control system is configured to, based upon the received signal, (i) determine a horizontal position of the feature associated with the body of the occupant sitting in the vehicle seat is located outside the zone of safe impact with the airbag in the deployed state, and (ii) based upon the determined horizontal position of the feature associated with the body of the occupant sitting on the vehicle seat, cause the vehicle seat adjustment mechanism to adjust the position of the vehicle seat such that the horizontal position of the feature associated with the body of the occupant sitting on the vehicle seat is located within the zone of safe impact with the airbag in the deployed state.

5. The vehicle of claim 1, wherein the vehicle sensor comprises at least one of (i) a pressure sensor, (ii) a camera, (iii) a weight sensor, (iv) a capacitance sensor, or (v) a laser.

6. The vehicle of claim 1, wherein:
   (i) the vehicle seat comprises a bench seat, the bench seat having a shared surface between two or more vehicle occupants and comprising:
      a first occupant seating area configured to accommodate a first vehicle occupant, the first occupant seating area comprising a seat back and a seat bottom, and
      a second occupant seating area configured to accommodate a second vehicle occupant, the second occupant seating area comprising a seat back and a seat bottom, and
   (ii) the vehicle seat adjustment control system is configured to adjust the position of (a) the seat back of the first occupant seating area, (b) the seat bottom of the first occupant seating area, (c) the seat back of the second occupant seating area, and (d) the seat bottom of the second occupant seating area.

7. The vehicle of claim 1, wherein
   (i) the seat adjustment mechanism comprises an inflatable bladder, and
   (ii) the vehicle seat adjustment control system is configured to, based upon the received signal, cause the inflatable bladder to inflate to adjust the position of the vehicle seat so that the feature associated with the body of the occupant sitting on the vehicle seat is located within the zone of safe impact with the airbag in the deployed state.

8. A vehicle occupant protection system comprising:
   a vehicle seat adjustment control system comprising at least one processor and configured to: (i) receive from a vehicle sensor a signal associated with an occupant sitting on a vehicle seat, and (ii) based upon the received signal, (a) determine a feature associated with a body of the occupant sitting on the vehicle seat is located outside a zone of safe impact with an airbag in a deployed state by a determined linear distance, and (b) cause a vehicle seat adjustment mechanism to adjust a position of the vehicle seat at least a distance corresponding to the determined linear distance so that the feature associated with the body of the occupant sitting on the vehicle seat is located within the zone of safe impact with the airbag in the deployed state.

9. The vehicle occupant protection system of claim 8, further comprising:
(i) the airbag, the airbag configured to be expanded between a stowed state and the deployed state,
(ii) the vehicle sensor, the vehicle sensor configured to generate the signal associated with the occupant sitting on the vehicle seat, and
(iii) the vehicle seat adjustment mechanism.

10. The vehicle occupant protection system of claim 8, wherein the vehicle seat adjustment control system is configured to, based upon the received signal, adjust at least one of a height or a horizontal position of the vehicle seat so that the feature associated with the body of the occupant sitting on the vehicle seat is located within the safe impact zone with the airbag in the deployed state.

11. The vehicle occupant protection system of claim 8, further comprising a vehicle seat adjustment mechanism, and wherein the vehicle seat adjustment control system is configured to, based upon the received signal, cause the vehicle seat adjustment mechanism to adjust a position of at least one of a seat bottom of the vehicle seat or a seat back of the vehicle seat so that the feature associated with the body of the occupant sitting on the vehicle seat is located within the safe zone of impact with the airbag in the deployed state.

12. The vehicle occupant protection system of claim 8, wherein the vehicle seat adjustment control system is configured to, based upon the received signal, cause the vehicle seat adjustment mechanism to adjust a height of a seat bottom of the vehicle seat or adjust an angle of a seat back of the vehicle seat so that the feature associated with the body of the occupant sitting on the vehicle seat is located within the safe impact zone with the airbag in the deployed state.

13. The vehicle occupant protection system of claim 8, wherein the vehicle adjustment control system is configured to (i) determine a height of the occupant sitting on the vehicle seat based upon the received signal, and (ii) based upon the determined height of the occupant sitting on the vehicle seat, cause the vehicle seat adjustment mechanism to adjust a height of the vehicle seat.

14. The vehicle occupant protection system of claim 8, further comprising the vehicle sensor, the vehicle sensor configured to sense a height of a head of the occupant sitting on the vehicle seat, and wherein the vehicle seat adjustment control system is configured to, based upon the sensed height of the head of the occupant sitting on the vehicle seat, determine the sensed height of the head of the occupant sitting in the vehicle seat is outside the zone of safe impact with the airbag in the deployed state.

15. The vehicle occupant protection system of claim 8, wherein the vehicle seat adjustment control system is configured to (i) determine a height of a head of the occupant sitting on the vehicle seat, and (ii) based upon the determined height of the head of the occupant sitting on the vehicle seat, determine the height of the head of the occupant sitting in the vehicle seat is outside the zone of safe impact with the airbag in the deployed state.

16. The vehicle occupant protection system of claim 8, further comprising the vehicle sensor, and wherein the vehicle sensor comprises at least one of (i) a pressure sensor, (ii) a camera, or (iii) a weight sensor.

17. The vehicle occupant protection system of claim 8, wherein the vehicle seat adjustment control system is configured to cause the vehicle seat adjustment mechanism to adjust a position of (i) a first occupant vehicle seat area of the vehicle seat, the first occupant vehicle seat area configured to accommodate a first vehicle occupant, or (ii) a second vehicle occupant seat area of the vehicle seat, the second vehicle seat area configured to accommodate a second vehicle occupant.

18. The vehicle occupant protection system of claim 8, wherein the vehicle seat adjustment control system is configured to cause the vehicle seat adjustment mechanism to adjust the position of the vehicle seat by inflating an inflatable bladder of the vehicle seat adjustment mechanism.

19. The vehicle occupant protection system of claim 8, further comprising the vehicle sensor, and wherein:
(i) the vehicle sensor comprises a camera configured to generate the signal associated with the occupant sitting on the vehicle seat, and
(ii) the vehicle seat adjustment control system is configured to receive the signal from the camera and (a) determine a height of a top of the head of the occupant sitting in the vehicle seat is outside the zone of safe impact with the airbag in the deployed state, and (b) cause the vehicle seat adjustment mechanism to adjust a position of the vehicle seat so that the height of the top of the head of the occupant sitting on the vehicle seat is located within the safe impact zone with the airbag in the deployed state.

20. One or more non-transitory computer-readable media storing instructions executable by one or more processors, wherein the instructions, when executed, cause the one or more processors to:
based upon a signal associated with an occupant sitting on a vehicle seat and received from a vehicle sensor:
determine a feature associated with a body of the occupant sitting on the vehicle seat is located outside a zone of safe impact with an airbag in a deployed state by a determined linear distance, the airbag configured to be at least partially stowed in a portion of the vehicle associated with a roof of the vehicle and configured to expand between a stowed state and the deployed state having a length that extends at least a portion of a distance between the roof and a floor of the vehicle, and
adjust a position of the vehicle seat at least a distance corresponding to the determined linear distance so that the feature associated with the body of the occupant sitting on the vehicle seat is located within the zone of safe impact with the airbag in the deployed state.

* * * * *